(12) United States Patent
Miyauchi et al.

(10) Patent No.: US 8,916,673 B2
(45) Date of Patent: Dec. 23, 2014

(54) PROCESS FOR PRODUCING LIQUID CRYSTALLINE POLYESTER RESIN AND APPARATUS FOR PRODUCING LIQUID CRYSTALLINE POLYESTER RESIN

(75) Inventors: Kunihiko Miyauchi, Iyo-gun (JP); Michiyoshi Matsumoto, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/996,815

(22) PCT Filed: Dec. 19, 2011

(86) PCT No.: PCT/JP2011/079302
§ 371 (c)(1),
(2), (4) Date: Jun. 21, 2013

(87) PCT Pub. No.: WO2012/090747
PCT Pub. Date: Jul. 5, 2012

(65) Prior Publication Data
US 2013/0296523 A1   Nov. 7, 2013

(30) Foreign Application Priority Data

Dec. 27, 2010 (JP) .................................. 2010-289989
Mar. 23, 2011 (JP) .................................. 2011-063726

(51) Int. Cl.
C08G 63/00 (2006.01)
C08G 63/78 (2006.01)
B01J 19/02 (2006.01)
C08G 63/60 (2006.01)
C08G 63/02 (2006.01)

(52) U.S. Cl.
CPC ............... *B01J 19/02* (2013.01); *C08G 63/785* (2013.01); *C08G 63/605* (2013.01)
USPC ............................ 528/193; 528/194; 528/196

(58) Field of Classification Search
USPC .......................... 528/193, 194, 201, 203, 204
See application file for complete search history.

(56) References Cited

U.S. PATENT DOCUMENTS

| | | | |
|---|---|---|---|
| 5,798,432 A | 8/1998 | Lee et al. | |
| 7,635,726 B2 * | 12/2009 | Hosoda et al. | 522/165 |
| 2003/0088053 A1 | 5/2003 | Ohbe et al. | |
| 2007/0243376 A1 | 10/2007 | Tachikawa et al. | |
| 2012/0330053 A1 * | 12/2012 | Hosoda et al. | 560/255 |
| 2013/0296524 A1 * | 11/2013 | Matsumoto et al. | 528/305 |

FOREIGN PATENT DOCUMENTS

| | | |
|---|---|---|
| JP | 2-58831 A | 2/1990 |
| JP | 6-192404 A | 7/1994 |
| JP | 10-7781 A | 1/1998 |
| JP | 2000-508002 A | 6/2000 |
| JP | 2001-072750 A | 3/2001 |
| JP | 2003-171450 A | 6/2003 |
| JP | 2004-256656 A | 9/2004 |
| JP | 2004-331829 A | 11/2004 |
| JP | 2004-352862 A | 12/2004 |
| JP | 2006-089714 A | 4/2006 |

OTHER PUBLICATIONS

International Search Report dated Mar. 13, 2013, from PCT International Application No. PCT/JP2011/079302.
Partial English translation of the relevant paragraphs of JP 02-58531.
Partial English translation of the relevant paragraphs of JP 10-7781.
Chinese Office Action issued Mar. 25, 2014 in counterpart Chinese Application No. 201180053063.8, including an English translation.

* cited by examiner

*Primary Examiner* — Terressa Boykin
(74) *Attorney, Agent, or Firm* — RatnerPrestia

(57) ABSTRACT

The present invention provides a process for producing a liquid crystalline polyester resin, wherein an acetylation reaction and an oligomerization reaction of raw materials are carried out in an acetylation reaction vessel, and then a deacetylation polycondensation of a liquid after the oligomerization reaction is carried out in a polycondensation reaction vessel, wherein the acetylation reaction vessel used is a vessel having an inner wall surface composed of an alloy containing 50% by mass or more of Ni and 10% by mass or more of Mo; and the inner wall surface of the acetylation reaction vessel is divided into three or more band-like zones arrayed in the height direction of the vessel, and the oligomerization reaction is carried out while maintaining the temperatures of each band-like zone in a particular relationship.

18 Claims, 4 Drawing Sheets

PROCESS FOR PRODUCING LIQUID CRYSTALLINE POLYESTER RESIN AND APPARATUS FOR PRODUCING LIQUID CRYSTALLINE POLYESTER RESIN

CROSS-REFERENCE TO RELATED APPLICATIONS

This application is the U.S. National Phase application of PCT International Application No. PCT/JP2011/079302, filed Dec. 19, 2011, and claims priority to Japanese Patent Application No. 2010-289989, filed Dec. 27, 2010, and Japanese Patent Application No. 2011-063726, filed Mar. 23, 2011, the disclosures of each of which are incorporated herein by reference in their entireties for all purposes

TECHNICAL FIELD

The present invention relates to a process for producing a liquid crystalline polyester resin and an apparatus for producing a liquid crystalline polyester resin.

BACKGROUND OF THE INVENTION

Liquid crystalline polyester resin has excellent heat resistance, flowability, electrical properties, and the like, and, utilizing such excellent properties, it has been increasingly demanded mainly in miniature precision molded articles for electric and electronic use. Further, in recent years, attention has been paid to its thermal stability and high thermal dimensional accuracy, and studies have been conducted for using in a liquid crystal display-supporting substrate in office automation equipment or cellular phones as a supporting substrate in heat-generating parts, structural parts of a lamp, and the like.

As a raw material of liquid crystalline polyester resin, p-hydroxybenzoic acid and 6-hydroxy-2-naphthoic acid as principal components; and diols such as hydroquinone, 4,4'-dihydroxybiphenyl, 2,6-naphthalene diol and aliphatic diol, dicarboxylic acids such as terephthalic acid, isophthalic acid, 2,6-naphthalene dicarboxylic acid, and aliphatic dicarboxylic acid, and amino group-containing monomers such as p-aminobenzoic acid and aminophenol as copolymer components are used.

Improving melt processability and preventing gas generation and bulging of a molded article by providing a specific composition ratio using, in particular, hydroquinone have been studied (Patent Documents 1 to 3).

In addition, prolonging a washing cycle of a reaction vessel by defining the temperature of an area located at the liquid level of a reaction solution and near the liquid level of the reaction solution thereabove and returning distillate by blowing has been studied (Patent Document 4). Further, obtaining a liquid crystalline polyester resin having excellent heat resistance by distilling a defined amount of acetic acid in an acetylation reaction vessel and then transferring a reaction solution to a polymerization vessel has been studied (Patent Document 5).

Meanwhile, for producing a liquid crystalline polyester resin, there is an acetylation reaction process using acetic anhydride. In the acetylation reaction process, a vapor phase portion of a reaction vessel and pipes at even upper parts corrode, and, accordingly, countermeasures therefor have been studied. For example, a method of preventing corrosion of an acetylation reaction vessel and at the same time improving color tone and processability by selecting glass lining, titanium, or hastelloy as a material of the reaction vessel has been proposed (Patent Documents 6 to 9).

PATENT DOCUMENTS

Patent Document 1: JP 2004-256656 A (Claims)
Patent Document 2: JP 2004-352862 A (Claims)
Patent Document 3: JP 2006-89714 A (Claims)
Patent Document 4: JP H10-7781 A (Claims)
Patent Document 5: JP H06-192404 A (Claims)
Patent Document 6: JP 2001-72750 A (Claims)
Patent Document 7: JP 2003-171450 A (Claims)
Patent Document 8: JP 2000-508002 W (Example 6)
Patent Document 9: JP H02-58531 A (Claims)

SUMMARY OF THE INVENTION

Production of a liquid crystalline polyester resin involves an acetylation reaction in which a given amount of monomer mixture and acetic anhydride is charged to a reaction vessel and heated with stirring under a nitrogen gas atmosphere, and hydroxyl groups are acetylated under reflux; an oligomerization reaction in which acetic acid is then distilled to a defined amount while raising the temperature to a predetermined temperature; and, further, a polycondensation reaction in which decompression is performed to complete the acetic acid distillation, and, at the same time, the reaction is allowed to proceed to a defined viscosity. Generally, taking production efficiency into serious consideration, an acetylation reaction vessel and a polycondensation reaction vessel are often used, but, for example, the method in Patent Document 4 requires complicated equipment, which is economically ineffective. Further, the effect is insufficient depending on where a jacket is divided.

Even if the method in Patent Document 5 is used, in a system using hydroquinone, an oxide film of stainless steel is broken by the high reducing property of hydroquinone, and corrosion at the inner wall of a reaction vessel, particularly, at the vapor phase portion is conspicuous. Consequently, the acetylation reaction vessel will be unusable in a short period of time. Further, the resulting product will have a deteriorated color tone because of components leaked out by the corrosion. Furthermore, there is also a problem in that hydroquinone is readily volatilized because of having a boiling point and condensed and deposited at the vapor phase portion of a reaction vessel and even upper parts. In particular, in the step of acetic acid distillation (oligomerization reaction) after an acetylation reaction, hydroquinone and acetylated products thereof dispersed from a concentrated reaction solution are condensed and deposited at the vapor phase portion of a reaction vessel and even upper parts where the temperature has been elevated by raising the temperature, thereby increasing the influence of corrosion.

Accordingly, the methods in Patent Documents 6 to 9 have been proposed; glass lining and titanium have no problem in corrosion resistance but are expensive, increasing the equipment cost. In addition, to avoid sudden temperature rise from the standpoint of equipment protection, it is necessary to raise the temperature over a long time, which leads to poor productivity. Further, also when hastelloy is used, volatilized products of hydroquinone and acetylated products thereof are deposited, which also leads to poor productivity such as increased washing frequency.

The present invention provides a process for producing a liquid crystalline polyester resin, by which process, in the step of acetic acid distillation in an acetylation reaction vessel, corrosion of the inner wall of the vessel can be prevented, and further adhesion of contaminants to the inner wall surface of the vessel can be prevented to thereby improve a washing cycle and quality. Further, the present invention provides an apparatus for producing a liquid crystalline polyester resin that is able to implement such a production process.

The present inventors discovered that when the inner wall surface of an acetylation reaction vessel is made of an alloy of a specific ratio and the temperature of the inner wall surface of the acetylation reaction vessel during an oligomerization reaction is in a specific distribution, corrosion of the inner wall of the vessel during the oligomerization reaction can be prevented. Further, the present inventors discovered that adhesion of contaminants to the inner wall surface of the vessel can be prevented, and a washing cycle and quality can be improved.

Thus the present invention provides a process for producing a liquid crystalline polyester resin, comprising carrying out an acetylation reaction and an oligomerization reaction of raw materials in an acetylation reaction vessel, and then carrying out a deacetylation polycondensation of a liquid after the oligomerization reaction in a polycondensation reaction vessel, wherein the acetylation reaction vessel used is a vessel having an inner wall surface composed of an alloy containing 50% by mass or more of Ni and 10% by mass or more of Mo; and the inner wall surface of the acetylation reaction vessel is divided into three or more band-like zones arrayed in the height direction of the vessel, and the oligomerization reaction is carried out while maintaining the temperatures of each band-like zone in a particular relationship, provided that, when taking each of the band-like zones as a band-like zone 1, a band-like zone 2, . . . , and a band-like zone n from the bottom of the acetylation reaction vessel, at least a band-like zone m is located within the vessel height ratio represented by Equation (1) below of 20 to 80%; n is an integer of 3 or more; and m is any of 2 to (n−1); and for the particular relationship of the temperatures of each of the band-like zones, during the oligomerization reaction, the temperatures of the band-like zone 1 to a band-like zone (m−1) are all controlled at higher than the temperature of the band-like zone m, and the temperatures of a band-like zone (m+1) to the band-like zone n are all controlled at lower than the temperature of the band-like zone m from the point when an acetic acid distillation rate represented by Equation (2) below reaches 80% or more to the point when an acetic acid distillation speed represented by Equation (3) below decreases to 0.1%/min or less:

Vessel height ratio (%)=Height from the lowest point inside acetylation reaction vessel to corresponding position (mm)/Height from the lowest point inside acetylation reaction vessel to the highest point (mm)×100(%)    Equation (1)

Acetic acid distillation rate (%)=Amount of distillate (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%);    Equation (2)

and

Acetic acid distillation speed(%/min)=Amount of acetic acid distillate that distilled in 5 minutes (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%)/5 (min).    Equation (3)

Further, the apparatus for producing a polyester resin of the present invention is able to implement the process for producing a polyester resin of the present invention and is an apparatus for producing a liquid crystalline polyester resin, comprising an acetylation reaction vessel and a polycondensation reaction vessel, wherein the acetylation reaction vessel has an inner wall surface composed of an alloy containing 50% by mass or more of Ni and 10% by mass or more of Mo and comprises at least three heating bodies to heat the inside of the vessel; and when taking the heating bodies as a heating body 1, a heating body 2, . . . , and a heating body n from the bottom of the acetylation reaction vessel, at least a heating body m is located within the vessel height ratio represented by Equation (1) below of 20 to 80%; n is an integer of 3 or more; and m is any integer from 2 to (n−1):

Vessel height ratio (%)=Height from the lowest point inside acetylation reaction vessel to corresponding position (mm)/Height from the lowest point inside acetylation reaction vessel to the highest point (mm)×100(%).    Equation (1)

According to the process for producing a liquid crystalline polyester resin of the present invention, during the oligomerization reaction in an acetylation reaction vessel, corrosion of the inner wall of the vessel can be prevented. Further, adhesion of contaminants to the inner wall surface of the vessel can be prevented to thereby improve a washing cycle and quality. Furthermore, if the apparatus for producing a liquid crystalline polyester resin of the present invention is used, the process for producing a liquid crystalline polyester resin of the present invention can be readily implemented.

DETAILED DESCRIPTION OF EMBODIMENTS OF THE INVENTION

[Liquid Crystalline Polyester Resin]

Figure 1:
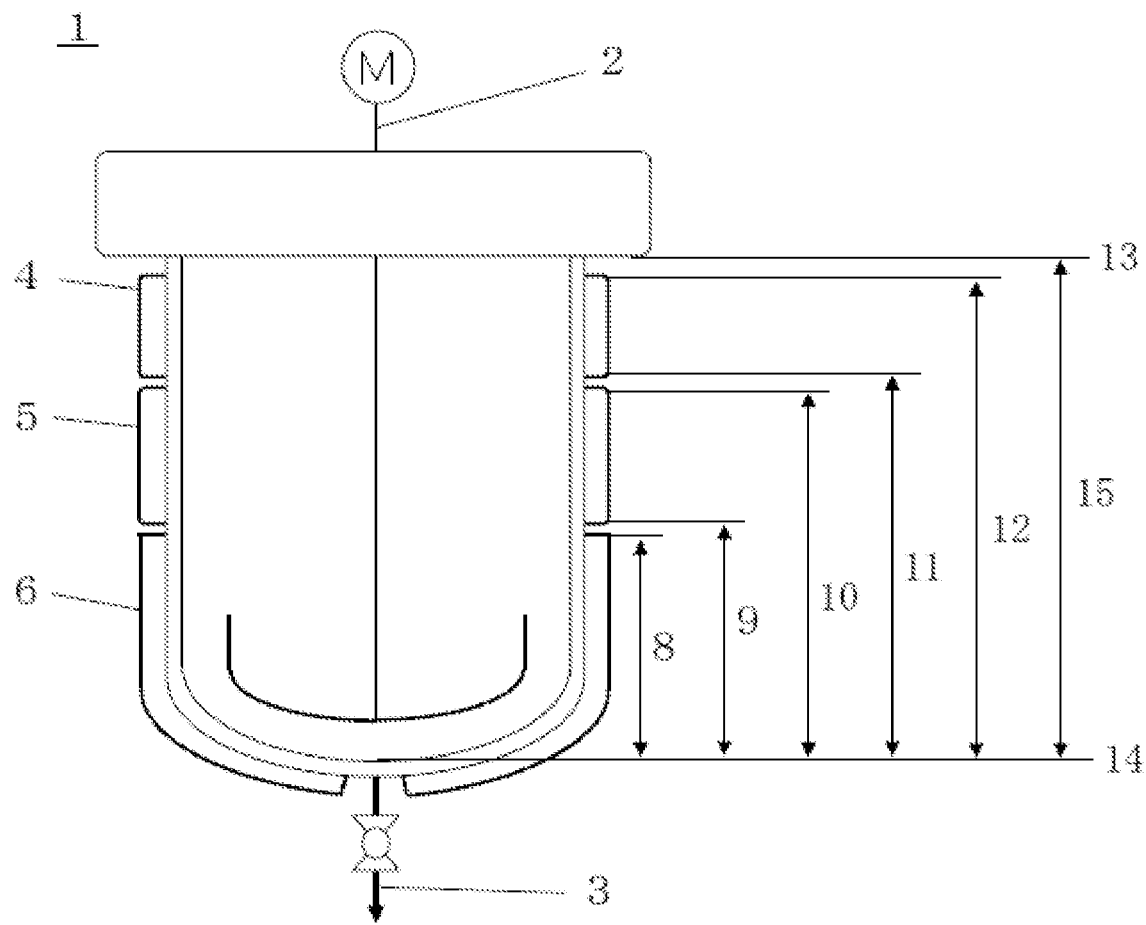
FIG. 1 is a schematic cross-sectional view of an acetylation reaction vessel in an embodiment of the present invention having an outer wall surface covered with three jackets.
Figure 2:
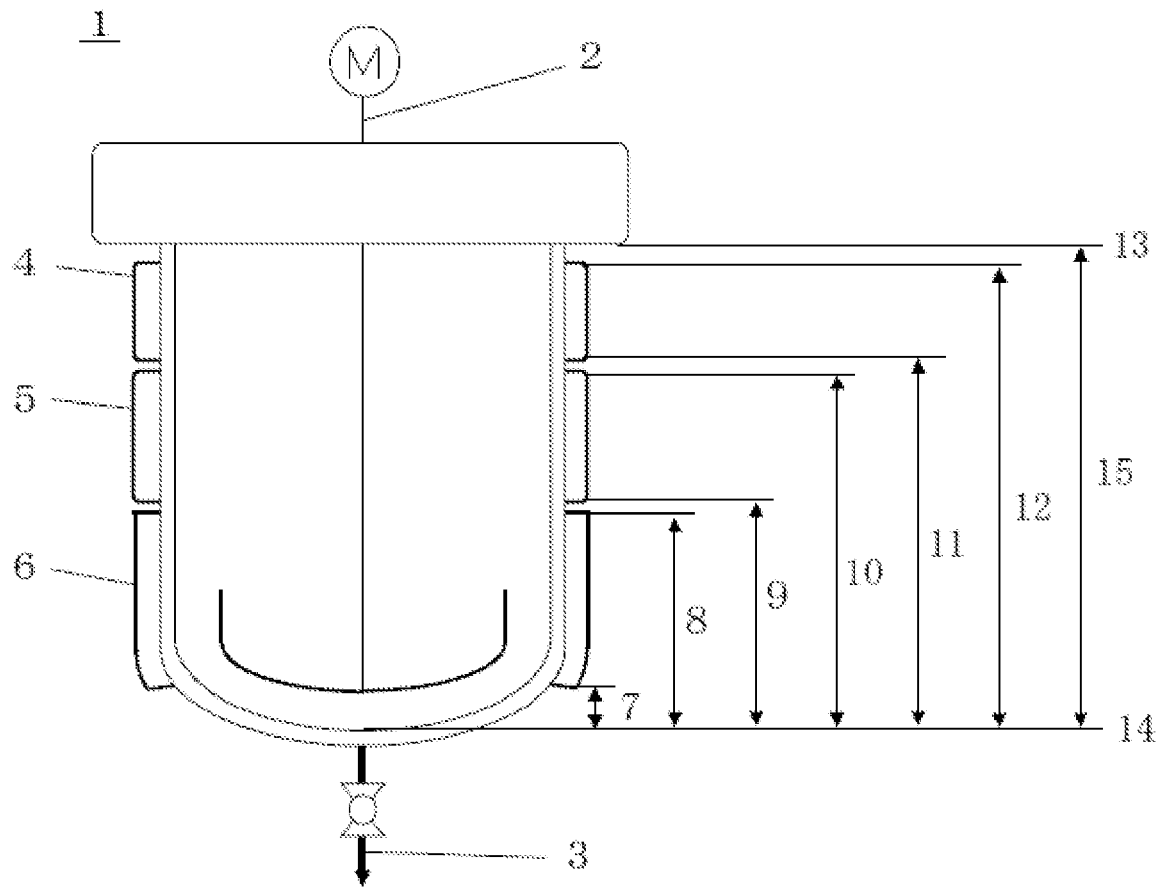
FIG. 2 is a schematic cross-sectional view of an acetylation reaction vessel in another embodiment of the present invention having an outer wall surface covered with three jackets.
Figure 3:
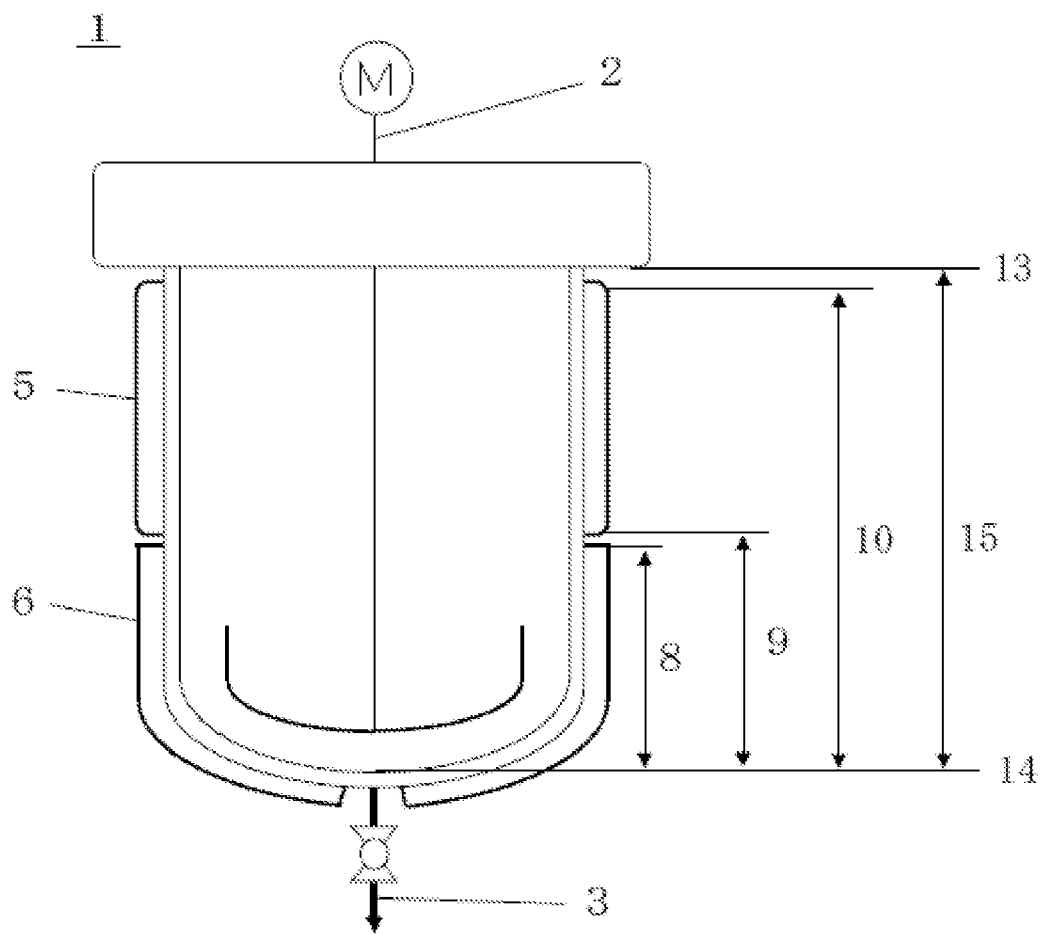
FIG. 3 is a schematic cross-sectional view of an acetylation reaction vessel having an outer wall surface covered with two jackets.

Liquid crystalline polyester resin is a resin that forms an anisotropy melt phase, and examples thereof include liquid crystalline polyester resins having an ester bond, such as liquid crystalline polyester and liquid crystalline polyester amide.

Specific examples of liquid crystalline polyester resins include a liquid crystalline polyester resin comprising a structural unit derived from p-hydroxybenzoic acid, a structural unit derived from 4,4'-dihydroxybiphenyl, a structural unit derived from hydroquinone, and a structural unit derived from terephthalic acid and/or isophthalic acid; a liquid crystalline polyester resin comprising a structural unit derived from p-hydroxybenzoic acid, a structural unit derived from ethylene glycol, a structural unit derived from 4,4'-dihydroxybiphenyl, a structural unit derived from hydroquinone, and a structural unit derived from terephthalic acid and/or isophthalic acid; a liquid crystalline polyester resin comprising a structural unit derived from p-hydroxybenzoic acid, a structural unit derived from ethylene glycol, a structural unit derived from 4,4'-dihydroxybiphenyl, and a structural unit derived from terephthalic acid and/or isophthalic acid; a liquid crystalline polyester resin comprising a structural unit derived from p-hydroxybenzoic acid, a structural unit derived from hydroquinone, a structural unit derived from 4,4'-dihydroxybiphenyl, a structural unit derived from 2,6-naphthalene dicarboxylic acid, and a structural unit derived from terephthalic acid; and the like. Among them, a preferred combination is, for example, p-hydroxybenzoic acid, hydroquinone, 4,4'-dihydroxybiphenyl, and terephthalic acid and/or isophthalic acid.

Examples of monomers used in addition to hydroquinone, p-hydroxybenzoic acid, 4,4'-dihydroxybiphenyl, terephthalic acid, and isophthalic acid include aromatic hydroxycarboxylic acids such as 6-hydroxy-2-naphthoic acid and aromatic dicarboxylic acids such as 2,6-naphthalene dicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, and the like. Examples of aromatic diols include resorcinol, t-butylhydroquinone, phenylhydroquinone, chlorohydroquinone, 2,6-dihydroxynaphthalene, 2,7-dihydroxynaphthalene, 3,4'-dihydroxybiphenyl, 2,2-bis(4-hydroxyphenyl)propane, 4,4'-dihydroxydiphenyl ether, and the like. Examples of monomers having an amino group include p-aminobenzoic acid, p-aminophenol, and the like.

Preferred examples of the liquid crystalline polyester resin that forms an anisotropy melt phase include a liquid crystalline polyester resin comprising structural units (I), (II), (III), (IV), and (V) below.

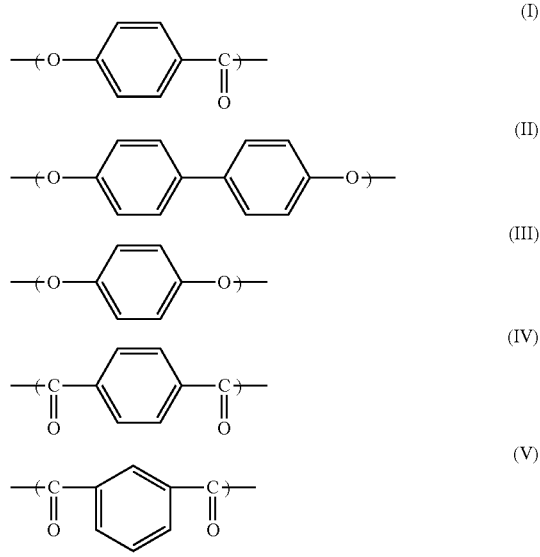

The above structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit, respectively.

A description will now be given with reference to this liquid crystalline polyester resin.

The amount of copolymerization of the structural units (I), (II), (III), (IV), and (V) above is any amount. However, the amount of copolymerization below is preferred to exhibit properties of the liquid crystalline polyester resin. The structural unit (I) is preferably 65 to 80 mol % and more preferably 68 to 78 mol %, based on the total of the structural units (I), (II), and (III). The structural unit (II) is preferably 55 to 85 mol %, more preferably 55 to 78 mol %, and most preferably 58 to 73 mol %, based on the total of the structural units (II) and (III). The structural unit (IV) is preferably 50 to 95 mol %, more preferably 55 to 90 mol %, and most preferably 60 to 85 mol %, based on the total of the structural units (IV) and (V).

The total of the structural units (II) and (III) and the total of (IV) and (V) are substantially equimolar. "Substantially equimolar" herein represents that structural units constituting a polymer main chain excluding termini are equimolar. Therefore, aspects in which structural units are not necessarily equimolar when structural units constituting termini are included can also satisfy the requirements for "substantially equimolar".

In particular, when the above-described structural unit having hydroquinone is selected, the present invention can be particularly effective because the inner wall of a reaction vessel is prone to corrosion due to hydroquinone; it takes time to obtain a homogeneous reaction solution; and variation in composition is likely to occur due to foaming or sublimation of hydroquinone.

In the above-described liquid crystalline polyester resins that are preferably used, in addition to components constituting the structural units (I) to (V) described above, aromatic dicarboxylic acids such as 3,3'-diphenyldicarboxylic acid and 2,2'-diphenyldicarboxylic acid; aliphatic dicarboxylic acids such as adipic acid, azelaic acid, sebacic acid, and dodecanedioic acid; alicyclic dicarboxylic acids such as hexahydroterephthalic acid; aromatic diols such as chlorohydroquinone, 3,4'-dihydroxybiphenyl, 4,4'-dihydroxydiphenyl sulfone, 4,4'-dihydroxydiphenyl sulfide, 4,4'-dihydroxybenzophenone, and 3,4'-dihydroxybiphenyl; aliphatic and alicyclic diols such as propylene glycol, 1,4-butanediol, 1,6-hexanediol, neopentyl glycol, 1,4-cyclohexanediol, and 1,4-cyclohexanedimethanol; m-hydroxybenzoic acid; polyethylene terephthalate; and the like can be further copolymerized as long as the liquid crystallinity and properties are not impaired.

For example, the following production process is preferably used to produce the liquid crystalline polyester resin described above. Although the following production process will be described with reference to synthesis of a liquid crystalline polyester resin comprising p-hydroxybenzoic acid, 4,4'-dihydroxybiphenyl, hydroquinone, terephthalic acid, and isophthalic acid, the copolymer composition is not limited thereto, and the liquid crystalline polyester resin can be produced in accordance with the following process with each component being replaced with other polyethylene terephthalate, hydroxycarboxylic acid, aromatic diol or aromatic dicarboxylic acid.

In embodiments of the present invention, the content of each structural unit in the liquid crystalline polyester resin can be calculated by the following processing. Namely, the liquid crystalline polyester resin is weighed into an NMR (Nuclear Magnetic Resonance) test tube and dissolved in a solvent (e.g., pentafluorophenol/deuterated tetrachloroethane-$d_2$ mixed solvent) that dissolves the liquid crystalline polyester resin to measure the $^1$H-NMR spectrum. The content of each structural unit can be calculated from the ratio of peak areas derived from each structural unit.

[Process for Producing Liquid Crystalline Polyester Resin]

The process for producing a liquid crystalline polyester resin of the present invention will now be described.

Production of a liquid crystalline polyester resin of the present invention involves an acetylation reaction in which a given amount of monomer mixture and acetic anhydride is charged to a reaction vessel and heated with stirring under a nitrogen gas atmosphere, and hydroxyl groups are acetylated under reflux; an oligomerization reaction in which acetic acid is then distilled to a defined amount while raising the temperature to a predetermined temperature; and, further, a polycondensation reaction in which decompression is performed to complete the acetic acid distillation, and, at the same time, the reaction is allowed to proceed to a defined viscosity.

In the apparatus for producing a liquid crystalline polyester resin, two vessels, an acetylation reaction vessel and a polycondensation reaction vessel, are used. In the acetylation reaction vessel, a first vessel, an acetylation reaction and an oligomerization reaction are carried out, and in the polycondensation reaction vessel, a second vessel, a deacetylation polycondensation reaction is carried out. As the acetylation reaction vessel, for example, a vessel comprising a raw material inlet, a stirring blade, a distillation pipe, jackets for heat control, and a transfer line can be used. As the polycondensation reaction vessel, for example, a vessel comprising a transfer line from the acetylation reaction vessel, a stirring blade, a distillation pipe, jackets for heat control, a decompressor, and a discharge port at the bottom can be used.

In the acetylation reaction, a given amount of monomer mixture and acetic anhydride is first charged to the acetylation reaction vessel and heated with stirring under a nitrogen gas atmosphere, and hydroxyl groups are acetylated under reflux. Next, in the oligomerization reaction, acetic acid is distilled by switching to the distillation pipe while raising the temperature to a predetermined temperature, and acetic acid is distilled to a defined amount. Then, a reaction solution is transferred to the polycondensation reaction vessel; the polycondensation reaction vessel is decompressed when a defined amount of acetic acid has been distilled; and the deacetylation polycondensation reaction is terminated when a defined stirring torque has been reached. Upon termination of the deacetylation polycondensation reaction, the stirring is stopped, and the pressure in the reaction vessel is increased with nitrogen. The reactant was formed into a strand from the bottom of the reaction vessel via a die and pelletized using a cutting apparatus.

[Acetylation Reaction and Oligomerization Reaction in Acetylation Reaction Vessel]

The process for producing a liquid crystalline polyester resin of an embodiment of the present invention is a process in which, when producing a liquid crystalline polyester resin according to this process, a vessel, the inner wall surface of which is composed of an alloy containing 50% by mass or more of Ni and 10% by mass or more of Mo, is used as an acetylation reaction vessel; and the inner wall surface of the acetylation reaction vessel is divided into three or more band-like zones arrayed in the height direction of the vessel, and an oligomerization reaction is carried out while maintaining the temperatures of each band-like zone in a particular relationship.

When taking the three or more band-like zones arrayed in the height direction of the vessel as a band-like zone 1, a band-like zone 2, . . . , and a band-like zone n (provided that n is an integer of 3 or more) from the bottom of the acetylation reaction vessel, at least a band-like zone m (provided that m is any integer from 2 to (n−1)) is located within the vessel height ratio represented by Equation (1) below of 20 to 80%. Namely, at least one band-like zone in the other band-like zones excluding the band-like zone 1 at the bottom and the band-like zone n at the top is located within the vessel height ratio of 20 to 80%.

Vessel height ratio (%)=Height from the lowest point inside acetylation reaction vessel to corresponding position (mm)/Height from the lowest point inside acetylation reaction vessel to the highest point (mm)×100(%).     Equation (1)

For the particular relationship of the temperatures of each band-like zone, during an oligomerization reaction, the temperatures of the band-like zone 1 to a band-like zone (m−1) are all controlled at higher than the temperature of the band-like zone m, and the temperatures of a band-like zone (m+1) to the band-like zone n are all controlled at lower than the temperature of the zone m from the point when an acetic acid distillation rate represented by Equation (2) below reaches 80% or more to the point when an acetic acid distillation speed represented by Equation (3) below decreases to 0.1%/min or less:

Acetic acid distillation rate (%)=Amount of distillate (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%);     Equation (2)

and

Acetic acid distillation speed(%/min)=Amount of acetic acid distillate that distilled in 5 minutes (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%)/5 (min).     Equation (3)

The amount of acetic anhydride used is preferably 1.00 to 1.20 molar equivalents and more preferably 1.03 to 1.16 molar equivalents of the total phenolic hydroxyl groups in liquid crystalline polyester resin raw materials used.

In the acetylation reaction, it is preferable to carry out the reaction until the residual amount of monoacetylated product of aromatic diol is in a particular range while refluxing a reaction solution at a temperature of 125° C. to 150° C. As an apparatus for the acetylation reaction, for example, a reaction apparatus comprising a reflux pipe, a rectifying column, and a condenser can be used. The reaction time for acetylation is roughly about 1 to 5 hours, and the time until the residual amount of monoacetylated product of aromatic diol is in a particular range varies depending on the liquid crystalline polyester resin raw materials used and the reaction temperature. Preferably, it is 1.0 to 2.5 hours; the higher the reaction temperature, the shorter the time, and the larger the molar ratio of acetic anhydride to a phenolic hydroxyl group terminal, the reaction can be carried out in a shorter time, which are preferred.

Then, in the oligomerization reaction, when the temperature is raised to a predetermined temperature while distilling acetic acid, it is preferable to carry out the reaction with the head temperature of the rectifying column being in the range of 115° C. to 150° C.

Further, for obtaining a homogeneous liquid crystalline polyester resin, the relationship between the temperature of a reaction solution and the acetic acid distillation rate during an oligomerization reaction is important; it is preferable to raise the temperature for distillation such that the acetic acid distillation rate is 50 to 80% when the temperature of a reaction solution is 250° C., and the oligomerization reaction is continued until the acetic acid distillation speed decreases to 0.1%/min or less. Preferably, the reaction solution is transferred to a polymerization vessel after the acetic acid distillation rate has reached 85% or more when the temperature of the reaction solution is in the range of 260° C. to 275° C. More preferably, the reaction solution is transferred when the acetic acid distillation rate is 88% or more. By transferring the reaction solution when the acetic acid distillation rate is 85% or more, efficient reaction of hydroquinone can be achieved; the state of distillation is stabilized; and a good liquid crystalline polyester resin with less variation in composition can be obtained, which are preferred. Further, by transferring the reaction solution when the acetic acid distillation rate is 85% or more, reaction of the residual dicarboxylic acid is promoted, thereby resulting in a homogeneous reaction solution, and a transfer line can be provided with a filter having openings of 0.5 mm or less; therefore, it can preferably be used as a condition for obtaining a good quality polymer with a small amount of contaminant.

In this application, "the start of the oligomerization reaction" refers to a time point when distillation of acetic acid starts after completion of the acetylation reaction, and "the end of the oligomerization reaction" refers to a time point when the acetic acid distillation speed first decreases to 0.1%/min or less after exceeding 0.1%/min. "During an oligomerization reaction" refers to a time period from the start to the end.

To achieve an acetic acid distillation rate of 85% or more, it is necessary that the inner wall surface of the acetylation reaction vessel be composed of an alloy and that the alloy be a Ni—Mo alloy containing 50% by mass or more of Ni and 10% by mass or more of Mo based on the total alloy. Preferably, the Ni—Mo alloy further contains 10% by mass or more of Cr. Using this Ni—Mo alloy prevents corrosion of the inner wall of the acetylation reaction vessel due to hydroquinone even when the reaction is carried out until the distillation rate reaches 85% or more. When a material other than this Ni—Mo alloy is used, corrosion occurs at a reaction liquid phase portion or particularly at a vapor phase portion; it takes a long time to raise the temperature; foaming due to sudden heating occurs; and strength reduction of a material in a high temperature zone occurs, which are not preferred.

Further, to achieve an acetic acid distillation rate of 85% or more, it is necessary that when an oligomerization reaction is carried out in the acetylation reaction vessel, the oligomerization reaction be carried out while maintaining the temperature of the inner wall surface of the vessel in a particular distribution. This particular temperature distribution is as described below.

First, the inner wall surface of an acetylation reaction vessel is divided into three or more band-like zones arrayed in the height direction of the vessel, and each band-like zone is taken as a band-like zone 1, a band-like zone 2, . . . , and a band-like zone n (n is an integer of 3 or more) from the bottom of the acetylation reaction vessel. Then, at least one band-like zone is selected from the other band-like zones excluding the band-like zone 1 at the bottom and the band-like zone n at the top, and the band-like zone selected is taken as a band-like zone m (m is any integer from 2 to (n−1)).

Then, an oligomerization reaction is carried out during the time from the point when an acetic acid distillation rate reaches 80% or more to the point when an acetic acid distillation speed decreases to 0.1%/min or less such that, during the oligomerization reaction, the temperatures of the band-like zone 1 to a band-like zone (m−1) are all controlled at higher than the temperature of the band-like zone m and the temperatures of a band-like zone (m+1) to the band-like zone n are all controlled at lower than the temperature of the band-like zone m. When the acetic acid distillation rate has reached 80% or more and the amount of acetic acid in the acetylation reaction vessel has increased, the vapor phase portion of the acetylation reaction vessel which has a strong tendency to corrosion is located in the range of the band-like zone (m+1) to the band-like zone n and controlled at a low temperature to prevent the corrosion. Meanwhile, to raise the temperature of the reaction solution, the lower part of the acetylation reaction vessel is located in the range of the band-like zone 1 to the band-like zone (m−1) and controlled at a high temperature. Further, the area at which the liquid level decreases because of distillation of acetic acid is located in the band-like zone m, and the temperature is controlled individually so as to establish the temperature relationship described above. According to the production process of the present invention, by controlling at such temperatures, the acetic acid distillation rate can be increased to 85% or more while preventing the corrosion inside the acetylation reaction vessel due to acetic acid.

For the position of the liquid level of the reaction solution, the liquid level is preferably located in the range of the band-like zone m at the end of the oligomerization reaction. At the start of the oligomerization reaction, the liquid level may be located in the range of the band-like zone (m+1) to n, but more preferably in the range of the band-like zone m. Namely, from the start to the end of the oligomerization reaction, it is preferred that the liquid level of the reaction solution change in the range of the band-like zone m.

In the process of distillation of acetic acid during the oligomerization reaction, the liquid level of the reaction solution decreases, and monomers and oligomers adhere to the wall surface appeared from the reaction solution. Then, such monomers and oligomers experience a heat history and turn into contaminants that do not melt even at or higher than the melting point of normal polymer, for example, 350° C. or higher. Thus, the temperature in the range within which the liquid level of the reaction solution changes is controlled individually to prevent deposition of fouling on the wall surface of the acetylation reaction vessel.

For the specific position of each band-like zone, the band-like zone m is preferably located within the vessel height ratio represented by Equation (1) below of 20 to 80%. The liquid level of the reaction solution during an oligomerization reaction changes within the vessel height ratio of 20 to 80%, and thus the band-like zone m is preferably set within this range. The positions of the band-like zone 1 to the band-like zone (m−1) located lower than the band-like zone m are not particularly limited, and preferably within the vessel height ratio of 0 to 60%. The positions of the band-like zone (m+1) to the band-like zone n located higher than the band-like zone m are also not particularly limited, and preferably within the vessel height ratio of 40 to 100%.

Vessel height ratio (%)=Height from the lowest point inside acetylation reaction vessel to corresponding position (mm)/Height from the lowest point inside acetylation reaction vessel to the highest point (mm)×100(%).  Equation (1)

For the specific temperature of each band-like zone during an oligomerization reaction, preferably, the band-like zone (m+1) to the band-like zone n are all 100 to 210° C.; the band-like zone m is 120 to 250° C.; and the band-like zone 1 to the band-like zone (m−1) are all 120 to 330° C. Further, more preferably, the band-like zone (m+1) to the band-like zone n are all 110 to 200° C.; the band-like zone m is 130 to 240° C.; and the band-like zone 1 to the band-like zone (m−1) are all 130 to 320° C.

For the temperature difference between band-like zones during an oligomerization reaction, preferably, at an acetic acid distillation rate of 70% or more, the temperature of the band-like zone m is 10° C. or more higher than the temperature of any of the band-like zone (m+1) to the band-like zone n, and the temperature of any of the band-like zone 1 to the band-like zone (m−1) is 10° C. or more higher than the temperature of the band-like zone m. Further, more preferably, at an acetic acid distillation rate of 80% or more, the temperature of the band-like zone m is 20° C. or more higher than the temperature of any of the band-like zone (m+1) to the band-like zone n, and the temperature of any of the band-like zone 1 to the band-like zone (m−1) is 20° C. or more higher than the temperature of the band-like zone m.

The number of band-like zones may be three or more, but it is preferably three. As mentioned above, in the production process of the present invention, the inner wall surface of an acetylation reaction vessel may be divided into three zones at different temperatures during an oligomerization reaction, and, accordingly, the band-like zone only needs to be divided into three. Further, for a heating body to heat the wall of a vessel mentioned below, three heating bodies are enough, which is preferred also in terms of cost of equipment. When the number of band-like zones is three, the band-like zone m is a band-like zone 2. Adjacent band-like zones need not necessarily abut each other. As long as the effects of the present invention are not impaired, there may be a space where the temperature is not controlled between adjacent band-like zones.

[Apparatus for Producing Liquid Crystalline Polyester Resin]

To implement the process for producing a liquid crystalline polyester resin of the present invention, the production apparatus of the present invention has the following constitution.

First, the production apparatus has an acetylation reaction vessel and a polycondensation reaction vessel. The acetylation reaction vessel has an inner wall surface composed of an alloy, which alloy is a Ni—Mo alloy containing 50% by mass or more of Ni and 10% by mass or more of Mo based on the total alloy. Further, it is preferred that the Ni—Mo alloy further contain 10% by mass or more of Cr.

In addition, the production apparatus comprises a heating body 1, a heating body 2, . . . , and a heating body n corresponding to the band-like zone 1, the band-like zone 2, . . . , and the band-like zone n in order to keep each of the band-like zones mentioned above at a certain temperature. Further, a heating body corresponding to the band-like zone m is a heating body m, and the production apparatus comprises the heating body m within the vessel height ratio of 20 to 80%.

The placement position and type of the heating bodies are not particularly restricted, and they may be attached to the inner wall surface of the acetylation reaction vessel, embedded inside the wall of the vessel, or attached to the outer wall surface of the vessel to heat the inner wall surface indirectly via the wall of the vessel. Examples of those which are attached to the inner wall surface or embedded inside the wall include a coil and the like. Examples of those which are attached to the outer wall surface of the vessel include a coil, jacket, and the like. Among them, the method of attaching a jacket to the outer wall surface is preferred because a position to be heated can be readily changed and a heating range can be heated at a uniform temperature. As a method of generating heat in a heating body, the method of heating a jacket or coil with a heating wire, the method of circulating the inside of a jacket or coil with vapor or a liquid heating medium, or the like is used. Preferred is the method of circulating with vapor or a liquid heating medium. More preferred is the method of circulating the inside of a jacket with a liquid heating medium using a pump, and this method allows stable temperature control. Depending on band-like zone, positive heating is not necessary, and keeping warm can be enough. In such a band-like zone, a heat-insulating material that does not have a heating wire or a heating medium circulation line may be used. In this application, "heating body" also include such a heat-insulating material.

The position of each heating body corresponds to the position of each band-like zone. Specifically, the heating body m is placed within the vessel height ratio of 20 to 80%. The heating body 1 to a heating body (m−1) are placed lower than the heating body m, and preferably placed within the vessel height ratio of 0 to 60%. A heating body (m+1) to the heating body n are placed higher than the zone m, and preferably placed within the vessel height ratio of 40 to 100%. In the case of a heating body attached to the outer wall surface of an acetylation reaction vessel, the position of the upper end and the lower end of the heating body are the position of the upper end and the lower end of a contacting surface between the heating body and the outer wall surface, respectively. As in the case of the heating body of symbol 6 in FIG. 1, the position of the lower end can be lower than the vessel height ratio of 0% (symbol 14) by the vessel thickness of the acetylation reaction vessel. In such a case, the lower end of the heating body is considered to be located at the vessel height ratio of 0%.

For the temperature of each heating body, in order to achieve the temperature relationship of each band-like zone mentioned above, during an oligomerization reaction, the temperatures of the heating body 1 to the heating body (m−1) are all controlled at higher than the temperature of the heating body m, and the temperatures of the heating body (m+1) to the heating body n are all controlled at lower than the temperature of the heating body m from the point when an acetic acid distillation rate reaches 80% or more to the point when an acetic acid distillation speed decreases to 0.1%/min or less.

Also for specific temperature of each heating body, in order to achieve the specific temperature of the band-like zones mentioned above, during an oligomerization reaction, preferably, the temperatures of the heating body (m+1) to the heating body n are all controlled at 100 to 210° C.; the temperature of the heating body m is controlled at 120 to 250° C.; and the temperatures of the heating body 1 to the heating body (m−1) are all controlled in the range of 120 to 330° C. Further, more preferably, the temperatures of the heating body (m+1) to the heating body n are all controlled at 110 to 200° C.; the temperature of the heating body m is controlled at 130 to 240° C.; and the temperatures of the heating body 1 to the heating body (m−1) all controlled in the range of 130 to 320° C.

For the temperature difference between heating bodies during an oligomerization reaction, preferably, at an acetic acid distillation rate of 70% or more, the temperature of the heating body m is 10° C. or more higher than the temperature of any of the heating body (m+1) to the heating body n, and the temperature of any of the heating body 1 to the heating body (m−1) is 10° C. or more higher than the temperature of the heating body m. Further, more preferably, at an acetic acid distillation rate of 80% or more, the temperature of the heating body m is 20° C. or more higher than the temperature of any of the heating body (m+1) to the heating body n, and the temperature of any of the heating body 1 to the heating body (m−1) is 20° C. or more higher than the temperature of the heating body m. Although the temperatures of the band-like zones and the heating bodies may be somewhat different, the temperature range and temperature relationship of the band-like zones mentioned above can be achieved by controlling the temperatures of the heating bodies within this temperature range and temperature relationship. When a jacket in which a heating medium circulation line is embedded as a heating body is used, the temperature of the heating body is a temperature of a heating medium measured with a thermometer attached to the entrance of a jacket portion.

The number of heating bodies may be three or more, but it is preferably three similarly to band-like zones. When the number of heating bodies is three, the heating body m is a heating body 2. If adjacent band-like zones do not abut each other, adjacent heating bodies need not necessarily abut each other.

The method of transfer from the acetylation reaction vessel to the polycondensation reaction vessel is not particularly limited. However, when a transfer line is provided with a filter, contaminants collected in pores of the filter cause a pressure loss, and it takes a long time to transfer by free fall; therefore, the method of pressurizing the acetylation reaction vessel with nitrogen or the like for pressure pumping is preferred.

[Polycondensation Reaction in Polycondensation Reaction Vessel]

Figure 4:
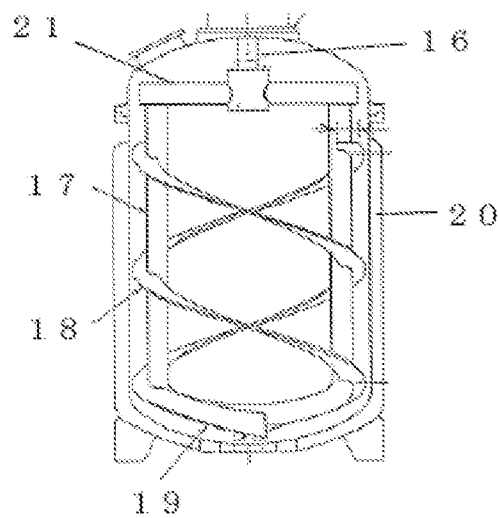
FIG. 4 is a schematic view illustrating a helical ribbon blade that does not have a central axis.
Figure 5:
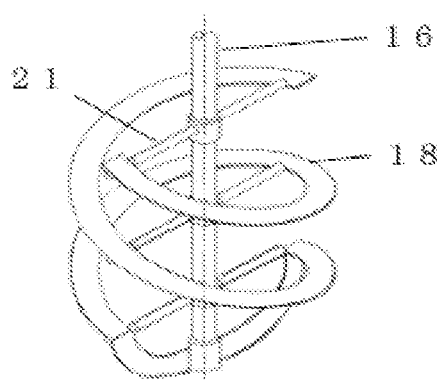
FIG. 5 is a schematic view illustrating a helical ribbon blade having a central axis.

As a polycondensation reaction vessel, it is preferable to use a reaction container comprising a helical ribbon blade as a stirring blade. Helical ribbon blade is an article which is provided with a ribbon blade at its stirring shaft frame in a spiral shape, and examples thereof include those as shown in FIG. 4 and FIG. 5. The helical ribbon blade in FIG. 4 is a helical ribbon blade which is provided with a ribbon blade at its frame that does not have a central axis (hereinafter referred to as a helical ribbon blade that does not have a central axis). The helical ribbon blade that does not have a central axis comprises a rotation axis 16, a fixing rod 21 which is fixed to the end of the rotation axis 16 and the longitudinal direction of which is the diameter direction of a reaction container 20, two or more frame rods 17 which are fixed to both ends of this fixing rod and the longitudinal direction of which is parallel to the wall surface of the reaction container 20, and a ribbon blade 18 spirally wound and fixed to the frame rods 17. Each frame rod is located such that the distance from the wall surface of the reaction container 20 is up to 0.2 times the inner diameter of the reaction container. Along with the rotation of the rotation axis 16, the ribbon blade 18 rotates in the reaction container 20 with the rotation axis 16 being centered. The helical ribbon blade in FIG. 5 comprises a rotation axis 16 which doubles as a central axis, a plurality of fixing rods 21 which are fixed to the rotation axis 16 and the longitudinal direction of which is the diameter direction of the reaction container 20, and a ribbon blade 18 which is fixed to the ends of the fixing rods 21 and goes spirally along the wall surface of the reaction container 20. The clearance of the helical ribbon blade 18 from the wall surface of the reaction container 20 is preferably 50 mm or less and more preferably 20 mm or less.

In a polycondensation reaction, the direction of rotation of the helical ribbon blade is more preferably the down-pumping direction in order to prevent the rising of reaction solution due to foaming or sublimation of hydroquinone. The down-pumping direction as used herein means that reaction solution near the can wall surface is held down toward the can bottom by the direction of rotation of the ribbon blade. On the other hand, the up-pumping direction means that reaction solution near the can wall surface is held upward by the direction of rotation of the ribbon blade.

Further, to achieve a more efficient stirring and mixing state, the stirring shear rate before decompression is preferably in the range of 150 to 500 (1/sec). The lower limit of the stirring shear rate is more preferably not less than 200 (1/sec). The upper limit of the stirring shear rate is more preferably not more than 350 (1/sec). The stirring shear rate refers to a value of shear rate of a stirring blade and a can wall surface determined by Equation (4) below:

Shear rate (1/sec)=2×2×3.14×Number of stirring (rotation/sec)×Inner diameter of can×Inner diameter of can/(Inner diameter of can×Inner diameter of can−Outer diameter of stirring blade×Outer diameter of stirring blade). Equation (4)

If the lower limit of the stirring shear rate is not less than 150 (1/sec), it is preferred because a reaction solution containing hydroquinone can be uniformly mixed. If the upper limit of the stirring shear rate is not more than 500 (1/sec), it is preferred because dispersion of reaction solution due to mixing by high-speed stirring and dispersion of sublimate can be prevented.

The helical ribbon blade is a preferably helical ribbon blade that does not have a central axis. When a helical ribbon blade that does not have a central axis is used, the amount of polymer attached to the central part of a stirring shaft at a low shear rate is small, and polymer that remains in the can be reduced as much as possible. As a result, extraordinary residence in the vicinity of the central axis does not occur; the reaction solution is uniformly stirred; a homogeneous reaction solution with a narrow inner temperature distribution can be obtained; and a good liquid crystalline polyester resin can be obtained.

Further, when a polycondensation reaction is carried out using a helical ribbon blade, it is necessary to perform decompression after hydroquinone has been reacted sufficiently, and, therefore, it is preferable to start the decompression at an acetic acid distillation rate of 90% or more, and more preferably 93% or more. If the acetic acid distillation rate is less than 90%, it is not preferred because insufficient reaction of hydroquinone causes dispersion of sublimate toward a decompressor after starting decompression or accelerates the foaming of hydroquinone.

The pressure during the polycondensation after reaching the acetic acid distillation rate of 90% is preferably reduced to 1333 Pa or lower, more preferably 133 Pa or lower.

The final polymerization temperature is preferably a melting point+about 20° C., and preferably 370° C. or lower.

In taking out the resulting polymer from a polycondensation reaction vessel after completion of a deacetylation polycondensation reaction, the pressure in the polycondensation reaction vessel is increased, for example, to about 0.02 to 0.5 MPa at a temperature that melts the polymer; the polymer is discharged in the form of a strand from a discharge port provided at the lower part of the polycondensation reaction vessel; and the strand is cooled in cooling water and cut into pellets to obtain resin pellets. The melt polymerization method is a method that is advantageous for producing a uniform polymer, which method is preferred because an excellent polymer with a smaller gas yield can be obtained.

In producing a liquid crystalline polyester resin, the polycondensation reaction can be completed also by the solid phase polymerization method. For example, there is a method in which a polymer or oligomer of a liquid crystalline polyester resin is ground using a mill, heated in the range of the melting point of the liquid crystalline polyester resin −5° C. to the melting point −50° C. for 1 to 50 hours under a stream of nitrogen or under decompression, and polycondensated to a desired degree of polymerization to complete the reaction. The solid phase polymerization method is an advantageous method for producing a highly-polymerized polymer.

The melt viscosity of the liquid crystalline polyester resin is preferably 10 to 500 Pa·s and more preferably 12 to 200 Pa·s. The melt viscosity is a value measured using a Koka-type flow tester under conditions of shear rate of 1000 (1/sec) under conditions of melting point (Tm)+10° C.

Although the melting point of the liquid crystalline polyester resin is not particularly limited, it is preferable to combine copolymer components such that the melting point is 280° C. or higher for use in high heat-resistant applications.

Although the polycondensation reaction of the liquid crystalline polyester resin proceeds without a catalyst, a metal compound such as stannous acetate, tetrabutyl titanate, potassium acetate and sodium acetate, antimony trioxide, or magnesium metal can also be used.

To impart mechanical strength and other properties to the liquid crystalline polyester resin, fillers can be further added. Examples of fillers that can be used include, but are not limited to, fibrous fillers, plate-like fillers, powder fillers, granular fillers, and the like. Specific examples thereof include, for example, glass fiber; PAN-based or pitch-based carbon fiber; metal fibers such as stainless fiber, aluminum fiber, and brass fiber; organic fibers such as aromatic polyamide fiber and liquid crystalline polyester fiber; fibrous or whisker-like fillers such as gypsum fiber, ceramic fiber, asbestos fiber, zirconia fiber, alumina fiber, silica fiber, titanium oxide fiber, silicon carbide fiber, rock wool, basalt fiber, titanium oxide whisker, potassium titanate whisker, barium titanate whisker, aluminum borate whisker, and silicon nitride whisker; and powdery, granular, or plate-like fillers such as mica, talc, kaolin, silica, glass bead, glass flake, glass microballoon, clay, molybdenum disulfide, wollastonite, titanium oxide, zinc oxide, calcium polyphosphate, and graphite. The fillers can also be used after treating their surface with a known coupling agent (e.g., a silane coupling agent, titanate coupling agent, or the like) or other finishing agents.

Among these fillers, in particular, glass fibers are preferably used in terms of the balance between availability and mechanical strength. The type of glass fiber is not particularly limited as long as it is commonly used for reinforcing resins, and, for example, one selected from long fiber-type or short fiber-type chopped strands, milled fibers, and the like can be used. Also, two or more of them can be used in combination. As a glass fiber, those which are weak alkaline are excellent in terms of mechanical strength and can be preferably used. Further, the glass fiber is preferably treated with, for example, an epoxy-based, urethane-based, or acrylic-based coating agent or bundling agent, and epoxy-based ones are particularly preferred. Further, the glass fiber is preferably treated with a silane coupling agent, titanate coupling agent, or the like, or other finishing agents, and epoxy silane coupling agents and amino silane coupling agents are particularly preferred.

The glass fiber may be coated or bundled with a thermoplastic resin such as an ethylene/vinyl acetate copolymer or a thermosetting resin such as an epoxy resin.

The amount of the filler is usually 30 to 200 parts by mass, and preferably 40 to 150 parts by mass, based on 100 parts by mass of the liquid crystalline polyester resin.

Further, to the liquid crystalline polyester resin, normal additives such as antioxidants and heat stabilizers (e.g., hindered phenol, hydroquinone, phosphites, substitution products thereof, and the like), UV absorbers (e.g., resorcinol and salicylate), stain inhibitors such as phosphite or hypophosphite, lubricants and mold releasing agents (montanic acid, metal salts thereof, esters thereof, and half-esters thereof, stearyl alcohol, stearamide, polyethylene wax, and the like), coloring agents containing dyes and pigments, carbon black as a conductive agent or a coloring agent, crystalline nucleus agents, plasticizing agents, flame retardants (bromine flame retardants, phosphorus flame retardants, red phosphorus, silicone flame retardants, and the like), flame retardant adjuvants, and antistatic agents; and a polymer other than thermoplastic resins can be added to further impart given properties.

As a method of adding these additives, it is preferable to use melt-kneading, and a known method can be used for the melt-kneading. For example, using a Banbury mixer, rubber roller, kneader, single- or twin-screw extruder, or the like, melt-kneading is performed at 180 to 350° C., more preferably at a temperature of 250 to 320° C. to provide a liquid crystalline polyester resin composition. In such cases, any method can be used: for example, 1) method of kneading a liquid crystalline polyester resin and optional components, fillers and other additives, together at a time; 2) method of first preparing a liquid crystalline polyester resin composition (master pellet) containing a liquid crystalline polyester resin and a high concentration of other additives, and then adding other thermoplastic resins, fillers, and other additives to a defined concentration (master pellet method); 3) portionwise addition in which a liquid crystalline polyester resin and a portion of other additives are once kneaded, and then fillers and the rest of the other additives are added; and the like.

The liquid crystalline polyester resin and the liquid crystalline polyester resin composition containing the same can be processed into three-dimensional molded articles, sheets, containers, pipes, films, and the like that have excellent surface appearance (color tone) and mechanical properties, heat resistance, and flame resistance by a usual molding method such as injection molding, extrusion molding, press molding, and the like. In particular, they are suitable for use in electric and electronic parts obtained by injection molding.

The liquid crystalline polyester resin and the liquid crystalline polyester resin composition containing the same thus obtained can be used, for example, in relay-related parts, coil-related parts, switch- and motor-related parts, sensor-related parts, bearing-related parts, HDD-related parts, LED-related parts, connector-related parts, sound absorbing/cushioning material-related parts, films, fibers, and the like.

EXAMPLES

The present invention will now be described specifically with reference to Examples and Comparative Examples, but the present invention is not limited thereto.

The production process in Examples 1 to 6 and Comparative Examples 1 to 5 was each performed for up to 10 times (10 batches), and the production process in Examples 7 to 15 and Comparative Examples 6 to 15 was each performed for up to 20 times (20 batches); the evaluations shown in (1) to (11)

below were performed. In cases where a test was finished at a batch less than the maximum batch number, the average value at the last batch is shown.

(1) Composition of Inner Wall Surface Alloy of Acetylation Reaction Vessel (% by Mass)

The same alloy as that of the inner wall surface of an acetylation reaction vessel was cut to 10 mm long×10 mm wide×3 mm thick. Using a scanning electron microscope equipped with an energy-dispersive X-ray analyzer (SEM-EDX Type N) manufactured by Hitachi High-Tech Fielding Corporation, composition of the cut alloy (% by mass) was examined.

(2) Liquid Level Position at the End of Oligomerization Reaction

After completion of an oligomerization reaction in an acetylation reaction vessel at the 1st batch of a test, a rod made of SUS was inserted through a flange at the upper part. A liquid level height was calculated from the position of reaction solution attached to the SUS rod to determine within which band-like zone the position of the liquid level is located.

(3) Acetic Acid Distillation Rate (%), Acetic Acid Distillation Speed (%/min)

During an Oligomerization Reaction in an Acetylation Reaction Vessel, Acetic Acid mass (g) in a container for distilled acetic acid was constantly measured, and an acetic acid distillation rate and an acetic acid distillation speed during the oligomerization reaction were determined. For an acetic acid distillation rate in a polycondensation reaction vessel, acetic acid mass (g) in a container for distilled acetic acid was constantly measured, and the acetic acid distillation rate was determined from the total acetic acid mass (g) of the acetic acid mass (g) distilled in the acetylation reaction vessel and the acetic acid mass (g) distilled in the polycondensation reaction vessel, which acetic acid distillation rate was employed as an acetic acid distillation rate at the start of decompression.

(4) Oligomerization Reaction Time (min)

The time from the start of distillation of acetic acid in an acetylation reaction vessel until the acetic acid distillation speed first decreases to 0.1%/min or less after exceeding 0.1%/min was evaluated for each test batch. The average value of all the test batches was employed as an oligomerization reaction time in each Example and Comparative Example.

(5) Mass of Filtered Collection (g)

After all the test batches were finished, a filter attached to the transfer line between an acetylation reaction vessel and a polycondensation reaction vessel was detached, and the mass of fouling was evaluated.

(6) Corrosion Rate at Vapor Phase Portion and Liquid Phase Portion in Vessel (mm/y)

A test piece was polished with #400 sandpaper and degreased, and the mass was measured. The corrosion rate at a vapor phase portion was measured by hanging the test piece on a SUS316L wire through a flange at the upper part. The corrosion rate at a liquid phase portion was measured by fixing the test piece to a stirring shaft with a SUS316L wire. The test piece was taken out after all the test batches were finished, washed with triethylene glycol at 250° C. for 5 hr, ultrasonically washed, washed with water, and dried, after which the mass was measured. The corrosion rate was determined by the following equation.

Corrosion rate (mm/y)=[365 (d)×24 (h)×mass difference between test pieces (g)]/[specific gravity of test piece (g/cm$^3$)×surface area of test piece (cm$^2$)×test time (h)]

For the test pieces after washing with water and drying, the surface was observed using a microscope.

(7) The Number of Batches in which Faulty Decompression Occurred

Test batches were continuously performed, and the number of the batch at which poor control and deflection of the degree of vacuum during decompression started to occur was investigated.

(8) The Number of Batches in which Die Clogging Occurred

Test batches were continuously performed, and the number of the batch at which a die of a discharge port started to be clogged was investigated.

(9) Product Yield

A product yield was calculated for each test batch. The average value of all the test batches was employed as a product yield in each Example and Comparative Example Product yield(%)=Pellet mass (kg)/Theoretical polymer mass (kg)×100.

(10) Variation in Melting Point (Standard Deviation)

Measurements were made using a differential scanning calorimeter DSC-7 manufactured by Perkin Elmer, Inc. An endothermic peak temperature (Tm1) observed when measured under the condition of raising the temperature at 20° C./min from room temperature was observed. Then, after being maintained at a temperature of Tm1+20° C. for 5 minutes, the temperature was once cooled to room temperature under the condition of lowering the temperature at 20° C./min, and an endothermic peak temperature (Tm2) observed when measured again under the condition of raising the temperature at 20° C./min was employed as a melting point; its standard deviation value was determined.

(11) Color Tone (L Value)

For the pellet obtained for each test batch, brightness (L value) was measured using a SM color computer apparatus manufactured by Suga tester. The average value of all the test batches was employed as a color tone (L value) in each Example and Comparative Example.

Example 1

A 5-L acetylation reaction vessel 1 that has a distillation pipe, a container for distilled acetic acid, and a helical blade and has an inner wall surface composed of a material A (composition: Ni; 57% by mass, Cr; 16% by mass, and Mo; 16% by mass) was provided. A jacket in which a heating medium circulation line was embedded was used as a heating body, and the outer wall surface of the acetylation reaction vessel 1 was covered with jackets divided into three. Each jacket covered the outer wall surface at an area as follows: a heating body 1 (a band-like zone 1): vessel height ratio; 0 to 30%, a heating body 2 (a band-like zone 2): vessel height ratio; 30 to 70%, and a heating body 3 (a band-like zone 3): vessel height ratio; 70 to 90%. Using a heater and a circulating pump connected to each jacket, a heating medium (available from Nippon Steel Chemical Co., Ltd., Therm-S 600) was circulated in the jackets. While controlling the temperature of the three jackets each individually, polymerization was carried out as described below.

To the acetylation reaction vessel 1, 1012 parts by mass (54 mol %) of p-hydroxybenzoic acid, 409 parts by mass (16 mol %) of 4,4'-dihydroxybiphenyl, 104 parts by mass (7 mol %) of hydroquinone, 339 parts by mass (15 mol %) of terephthalic acid, 182 parts by mass (8 mol %) of isophthalic acid, and 1527 parts by mass (1.10 equivalents of the total phenolic hydroxyl groups) of acetic anhydride were charged. The raw materials charged were acetylated for 1.5 hours with stirring under a nitrogen gas atmosphere, while maintaining the temperature of the reaction solution at 145° C. by controlling the temperature of the heating body 3 (the band-like zone 3) at 120° C. and the temperatures of the heating body 2 (the band-like zone 2) and the heating body 1 (the band-like zone 1) at 150° C.

Next, the distillation pipe was switched to the side of the container for distilled acetic acid, and an oligomerization reaction was continued until the acetic acid distillation speed decreased to 0.1%/min or less while raising the temperature of the heating body 3 (the band-like zone 3), the heating body 2 (the band-like zone 2), and the heating body 1 (the band-like zone 1) to 170° C., 220° C., and 275° C., respectively, at a temperature rise rate of 0.8° C./min. At this time, the temperature of the reaction solution was 267° C.; the acetic acid distillation rate was 89%; and the liquid level position was within the height range of the heating body 2 (the band-like zone 2).

Then, the reaction solution was transferred to a polycondensation reaction vessel 2 via a transfer line. The polycondensation reaction vessel 2 is a 5-L vessel having a distillation pipe, a container for distilled acetic acid, and a decompressor, in which vessel the gap between the inner wall of the polycondensation reaction vessel and a helical ribbon blade that does not have a central axis is 5 mm, and a material of the inner wall is SUS316L. In the polycondensation reaction vessel 2, the temperature of the reaction solution was raised to 335° C. over about 1 hour with stirring in the down-pumping direction at a shear rate of 285 (1/sec) under a nitrogen gas atmosphere. Decompression was started at the point when the acetic acid distillation rate reached 95%, and the decompression was carried out to 133 Pa (1 ton) over 1 hour. In the decompression, the stirring shear rate was changed to 180 (1/sec) at the point when 13.3 kPa (100 torr) was reached, and further the polycondensation reaction was continued under decompression. The deacetylation polycondensation reaction was terminated when a defined stirring torque was reached. Then, the pressure in the polycondensation reaction vessel 2 was increased to 0.1 MPa with nitrogen, and a polymer was discharged in the form of a strand via a die having a circular discharge port with a diameter of 10 mm and pelletized with a cutter. Ten batches of polymerization were repeated according to the process described above.

The corrosion rate of the test piece was acceptable, and also the amount of filtered collection was small and acceptable. For the quality of the pellet obtained, the melting point was 312.5° C. (average value) with little variation, and the color tone L value was also acceptable.

Example 2

Example 1 was repeated except that the components charged to the acetylation reaction vessel 1 were changed to those described below.
- 977 parts by mass of p-hydroxybenzoic acid (54 mol %)
- 541 parts by mass of 4,4'-dihydroxybiphenyl (22 mol %)
- 15 parts by mass of hydroquinone (1 mol %)
- 328 parts by mass of terephthalic acid (15 mol %)
- 177 parts by mass of isophthalic acid (8 mol %)
- 1476 parts by mass (1.10 equivalents of the total phenolic hydroxyl groups) of acetic anhydride The temperature of the reaction solution at the end of the oligomerization reaction in the acetylation reaction vessel 1 was 267° C., and the acetic acid distillation rate was 89%. The corrosion rate of the test piece was acceptable, and also the amount of filtered collection was small and acceptable. For the quality of the pellet obtained, the melting point was 324.1° C. (average value) with little variation, and the color tone L value was also acceptable.

Example 3

Example 1 was repeated except that the components charged to the acetylation reaction vessel 1 were changed to those described below.
- 1354 parts by mass of p-hydroxybenzoic acid (73 mol %)
- 228 parts by mass of 4,4'-dihydroxybiphenyl (9 mol %)
- 204 parts by mass of terephthalic acid (9 mol %)
- 236 parts by mass of polyethylene terephthalate (9 mol %)
- 0.36 parts by mass of sodium hypophosphite (0.02% by mass)
- 1382 parts by mass (1.11 equivalents of the total phenolic hydroxyl groups) of acetic anhydride The temperature of the reaction solution at the end of the oligomerization reaction in the acetylation reaction vessel 1 was 267° C., and the acetic acid distillation rate was 89%. The corrosion rate of the test piece was acceptable, and also the amount of filtered collection was small and acceptable. For the quality of the pellet obtained, the melting point was 326.2° C. (average value) with little variation, and the color tone L value was also acceptable.

Example 4

Example 1 was repeated except that areas of the outer wall of the acetylation reaction vessel 1 covered with the jackets divided into three was as follows: the heating body 1 (the band-like zone 1): vessel height ratio; 0 to 45%, the heating body 2 (the band-like zone 2): vessel height ratio; 45 to 70%, and the heating body 3 (the band-like zone 3): vessel height ratio; 70 to 100%.

The temperature of the reaction solution at the end of the oligomerization reaction in the acetylation reaction vessel 1 was 268° C.; the acetic acid distillation rate was 89%, and the liquid level position at the end of the reaction was within the height range of the heating body 1 (the band-like zone 1). After completion of the transfer to the polycondensation reaction vessel 2, a filter attached to the transfer line was detached to check fouling; there was adhesion of 6 g of white solid, but it was slight. The corrosion rate of the test piece was acceptable. For the quality of the pellet obtained, the melting point was 311.6° C. (average value) with little variation, and the color tone L value was also acceptable.

Example 5

Example 1 was repeated except that after an acetylation reaction was carried out in the acetylation reaction vessel 1 at a reaction solution temperature of 145° C. for 1.5 hours, the distillation pipe was switched to the side of the container for distilled acetic acid, and the temperature of the heating body 2 (the band-like zone 2) was raised to 250° C.

The temperature of the reaction solution at the end of the oligomerization reaction in the acetylation reaction vessel 1 was 267° C.; the acetic acid distillation rate was 89%; and the time until the end of the reaction was 175 minutes, which was about 5 minutes shorter.

The corrosion rate of the test piece was acceptable, and also the amount of filtered collection was small and acceptable. For the quality of the pellet obtained, the melting point was 312.0° C. (average value) with little variation, and the color tone L value was also acceptable.

Example 6

Example 1 was repeated except that in the acetylation reaction vessel 1, the oligomerization reaction was terminated at an acetic acid distillation speed of 0.14%/min and an acetic acid distillation rate of 84%, and then the reaction solution was transferred to the polycondensation reaction vessel 2 via a transfer line.

The temperature of the reaction solution at the end of the oligomerization reaction in the acetylation reaction vessel 1 was 263° C., and the time until the end of the reaction was 168 minutes, which was about 12 minutes shorter.

After completion of the transfer to the polycondensation reaction container 2, a filter attached to the transfer line was detached to check fouling; there was adhesion of 7 g of white solid, but it was slight.

The corrosion rate of the test piece was acceptable. For the quality of the pellet obtained, the melting point was 311.1° C. (average value) with little variation, and the color tone L value was also acceptable.

Example 7

Example 1 was repeated except that 20 batches of tests were repeated. The corrosion rate of the test piece was acceptable. For the quality of the pellet obtained, the melting point was 312.8° C. (average value) with little variation, and the color tone L value was also acceptable.

Example 8

Example 2 was repeated except that 20 batches of tests were repeated. The corrosion rate of the test piece was acceptable. For the quality of the pellet obtained, the melting point was 324.4° C. (average value) with little variation, and the color tone L value was also acceptable.

Example 9

Example 3 was repeated except that 20 batches of tests were repeated. The corrosion rate of the test piece was acceptable. For the quality of the pellet obtained, the melting point was 326.3° C. (average value) with little variation, and the color tone L value was also acceptable.

Example 10

Example 4 was repeated except that 20 batches of tests were repeated. The corrosion rate of the test piece was acceptable. For the quality of the pellet obtained, the melting point was 311.3° C. (average value) with little variation, and the color tone L value was also acceptable.

Example 11

Example 5 was repeated except that 20 batches of tests were repeated. The corrosion rate of the test piece was acceptable. For the quality of the pellet obtained, the melting point was 312.2° C. (average value) with little variation, and the color tone L value was also acceptable.

Example 12

Example 6 was repeated except that 20 batches of tests were repeated. The corrosion rate of the test piece was acceptable. For the quality of the pellet obtained, the melting point was 310.9° C. (average value) with little variation, and the color tone L value was also acceptable.

Example 13

Example 6 was repeated except that decompression was started in the polycondensation reaction vessel 2 at the point when the acetic acid distillation rate reached 89% and that 20 batches of tests were repeated.

Although deflection of the degree of vacuum during the decompression started to occur in the 19th batch, it was slight, and, therefore, the 20-batch continuous operation could be performed.

The corrosion rate of the test piece was acceptable. For the quality of the pellet obtained, the melting point was 310.6° C. (average value) with little variation, and the color tone L value was also acceptable.

Example 14

Example 7 was repeated except that decompression was started in the polycondensation reaction vessel 2 at the point when the acetic acid distillation rate reached 90% and that 20 batches of tests were repeated.

The corrosion rate of the test piece was acceptable. For the quality of the pellet obtained, the melting point was 312.3° C. (average value) with little variation, and the color tone L value was also acceptable.

Example 15

Example 7 was repeated except that a helical ribbon blade having a central axis was used in the polycondensation reaction vessel 2 and that 20 batches of tests were repeated.

Although die clogging started to be observed in the 19th batch, it was slight, and the 20-batch continuous operation could be performed.

The corrosion rate of the test piece was acceptable. For the quality of the pellet obtained, the melting point was 310.6° C. (average value) with little variation, and the color tone L value was also acceptable.

Comparative Example 1

Example 1 was repeated except that the material of the inner wall of the acetylation reaction vessel 1 was changed to titanium alloy (composition: Ni; 0% by mass, Cr; 0% by mass, and Mo; 0% by mass).

The temperature rise of the reaction solution in the acetylation reaction vessel 1 was slow. The temperature of the reaction solution at the end of the oligomerization reaction was 263° C., and the reaction time was greatly prolonged to 300 minutes. After completion of the transfer to the polycondensation reaction vessel 2, a filter attached to the transfer line was detached to check fouling; there was adhesion of 25 g of white solid.

Although the corrosion rate of the test piece was acceptable, the melting point was 307.9° C. (average value) and tended to be low with variation, and the color tone L value of the pellet obtained was low.

Comparative Example 2

Example 1 was repeated except that the material of the inner wall of the acetylation reaction vessel 1 was changed to glass lining (composition: Ni; 0% by mass, Cr; 0% by mass, and Mo; 0% by mass).

The temperature rise of the reaction solution in the acetylation reaction vessel 1 was slow. The temperature of the reaction solution at the end of the oligomerization reaction was 262° C., and the reaction time was greatly prolonged to 335 minutes. After completion of the transfer to the polycondensation reaction vessel 2, a filter attached to the transfer line was detached to check fouling; there was adhesion of 32 g of white solid.

Although the corrosion rate of the test piece was acceptable, the melting point was 307.3° C. (average value) and tended to be low with wide variation, and the color tone L value of the pellet obtained was low.

Comparative Example 3

Example 1 was repeated except that the material of the inner wall of the acetylation reaction vessel 1 was changed to SUS316L (composition: Ni; 14% by mass, Cr; 18% by mass, and Mo; 3% by mass).

The temperature of the reaction solution at the end of the oligomerization reaction in the acetylation reaction vessel 1 was 269° C., and the time until the end of the reaction was 165 minutes, which was about 15 minutes shorter.

After completion of the transfer to the polycondensation reaction vessel 2, a filter attached to the transfer line was detached to check fouling; there was adhesion of 16 g of white solid, and the test piece suffered general corrosion at both of the vapor phase portion and the liquid phase portion, with the corrosion rate being high. Further, at the inner wall and stirring shaft of the acetylation reaction vessel 1, traces of liquid level rising (fouling) considered to be foaming during the reaction were observed. For the quality of the pellet obtained, the melting point was 310.5° C. (average value), and the color tone L value was slightly low.

Comparative Example 4

Example 1 was repeated except that the material of the inner wall of the acetylation reaction vessel 1 was changed to SUS316L (composition: Ni; 14% by mass, Cr; 18% by mass, and Mo; 3% by mass) and that the reaction solution was transferred to the polycondensation reaction vessel 2 via a transfer line after the reaction was continued until reaching an acetic acid distillation speed of 0.24%/min and an acetic acid distillation rate of 80%.

The temperature of the reaction solution at the end of the oligomerization reaction in the acetylation reaction vessel 1 was 261° C., and the time until the end of the reaction was 147 minutes, which was about 33 minutes shorter. It became unable to perform the transfer in the 5th batch, and the test was stopped. The filter portion was inspected to find pores of the filter being clogged with unreacted monomers. The test apparatus was reconditioned, and the reaction container was washed, after which the test was resumed in the same method. However, it became unable to perform the transfer in the 5th batch, and the test was stopped.

The test piece suffered general corrosion at the vapor phase portion, with the corrosion rate being high, and suffered light general corrosion at the liquid phase portion.

Further, at the inner wall and stirring shaft of the acetylation reaction vessel 1, traces of liquid level rising (fouling) considered to be foaming during the reaction were observed. For the quality of the pellet obtained, the melting point was as low as 304.6° C. (average value of 10 batches in total) with wide variation, and the pellet tended to be black.

Comparative Example 5

The same acetylation reaction vessel 1 as in Example 1 was used except that a jacket in which a heating medium circulation line was embedded was used as a heating body and that the outer wall surface was covered with jackets divided into two. Each jacket covered the outer wall surface at an area as follows: the heating body 1 (the band-like zone 1): vessel height ratio; 0 to 50%, and the heating body 2 (the band-like zone 2): vessel height ratio; 50 to 90%. Using a heater and a circulating pump connected to each jacket, a heating medium was circulated in the jackets. While controlling the temperature of the two jackets each individually, polymerization was carried out as described below.

Example 1 was repeated except that original monomers were charged and acetylated for 1.5 hours with stirring under a nitrogen gas atmosphere at a reaction solution temperature of 145° C. while controlling the temperature of the heating body 2 (the band-like zone 2) at 150° C. and the temperature of the heating body 1 (the band-like zone 1) at 150° C., after which the distillation pipe was switched to the side of the container for distilled acetic acid, and the temperature of the heating body 2 (the band-like zone 2) and the temperature of the heating body 1 (the band-like zone 1) were raised individually to 275° C.

The temperature of the reaction solution at the end of the oligomerization reaction in the acetylation reaction vessel 1 was 265° C.; the time until the end of the reaction was 162 minutes, which was about 18 minutes shorter; and the liquid level position at the end of the reaction was within the height range of the heating body 1 (the band-like zone 1). After completion of the transfer to the polycondensation reaction vessel 2, a filter attached to the transfer line was detached to check fouling, and there was adhesion of 40 g of white solid.

The test piece underwent a slight color change at the vapor phase portion, but there was no problem at the liquid phase portion. For the quality of the pellet obtained, the melting point was 309.8° C. (average value) and tended to be low with wide variation, and the color tone L value was slightly low.

Comparative Example 6

Comparative Example 1 was repeated except that 20 batches of tests were repeated.

Although deflection of the degree of vacuum during the decompression started to occur in the 14th batch and die clogging started to be observed in the 18th batch, they were slight, and the 20-batch continuous operation could be performed.

For the quality of the pellet obtained, the melting point was 307.6° C. (average value) and tended to be low with variation, and the color tone L value was low.

Comparative Example 7

Comparative Example 6 was repeated except that the direction of rotation of the helical ribbon blade was up-pumping in the polycondensation reaction vessel 2.

Although deflection of the degree of vacuum during the decompression started to occur in the 12th batch and die clogging started to be observed in the 15th batch, they were slight, and the 20-batch continuous operation could be performed.

For the quality of the pellet obtained, the melting point was as low as 306.3° C. (average value) with wide variation, and the color tone L value was low.

After 20 batches, the upper part of the polycondensation reaction vessel 2 was disassembled to inspect the inside, and slight adhesion of polymers was observed at the vapor phase portion of the inner wall.

Comparative Example 8

Comparative Example 6 was repeated except that an anchor-type stirring blade having a central axis was used in the polycondensation reaction vessel 2.

Deflection of the degree of vacuum during the decompression started to occur in the 6th batch, and die clogging started to be observed in the 2nd batch. Thereafter, the die was changed after completion of the discharge in the 6th batch because the die clogging became worse. Further, deflection of the degree of vacuum during the decompression started to occur in the 7th batch, and the deflection of the degree of vacuum continued to increase. After the discharge in the 10th batch, a decompression line was inspected to find about half of the pipe being clogged with a sublimate, and therefore the experiment was stopped at this batch. The polymerization time after reaching the degree of vacuum of 1333 Pa was prolonged to 141 minutes (average of 10 batches).

For the quality of the pellet obtained, the melting point was as low as 304.1° C. (average value of 10 batches) with wide variation, and the pellet tended to be black. The product yield was low.

Comparative Example 9

Comparative Example 2 was repeated except that 20 batches of tests were repeated.

Although deflection of the degree of vacuum during the decompression started to occur in the 12th batch and die clogging started to be observed in the 18th batch, they were slight, and the 20-batch continuous operation could be performed.

For the quality of the pellet obtained, the melting point was as low as 306.9° C. (average value) with wide variation, and the color tone L value was low.

Comparative Example 10

Comparative Example 3 was repeated except that 20 batches of tests were repeated.

Although deflection of the degree of vacuum during the decompression started to occur in the 16th batch and die clogging started to be observed in the 18th batch, they were slight, and the 20-batch continuous operation could be performed.

Further, at the inner wall and stirring shaft of the acetylation reaction vessel 1, traces of liquid level rising (fouling) considered to be foaming during the reaction were observed. For the quality of the pellet obtained, the melting point was 310.1° C. (average value), and the color tone L value was slightly low.

Comparative Example 11

Comparative Example 4 was repeated except that 20 batches of tests were repeated.

It became unable to perform the transfer in the 5th batch, and the test was stopped. The filter portion was inspected to find pores of the filter being clogged with unreacted monomers. The test apparatus was reconditioned, and the reaction container was washed, after which the test was resumed in the same method. However, it became unable to perform the transfer in the 5th batch, and the test was stopped. Further, at the inner wall and stirring shaft of the acetylation reaction vessel 1, traces of liquid level rising (fouling) considered to be foaming during the reaction were observed.

The polymerization time after reaching the degree of vacuum of 1333 Pa was prolonged to 128 minutes (average of 10 batches in total).

The product yield was low.

For the quality of the pellet obtained, the melting point was as low as 304.6° C. (average value of 10 batches in total) with wide variation, and the pellet tended to be black.

Comparative Example 12

Comparative Example 11 was repeated except that decompression was started in the polycondensation reaction vessel 2 at the point when the acetic acid distillation rate reached 85%.

It became unable to perform the transfer in the 5th batch, and the test was stopped. The filter portion was inspected to find pores of the filter being clogged with unreacted monomers. The test apparatus was reconditioned, and the reaction container was washed, after which the test was resumed in the same method. However, it became unable to perform the transfer in the 5th batch, and the test was stopped. Further, at the inner wall and stirring shaft of the acetylation reaction vessel 1, traces of liquid level rising (fouling) considered to be foaming during the reaction were observed.

Deflection of the degree of vacuum during the decompression started to occur from the 1st batch, and the deflection gradually increased. After 5 batches, the decompression line of the polycondensation reaction vessel 2 was inspected to find about half or more of the pipe being clogged with a sublimate. The polymerization time after reaching the degree of vacuum of 1333 Pa was greatly prolonged to 300 minutes (average of 10 batches in total). The product yield was very low.

For the quality of the pellet obtained, the melting point was as low as 302.3° C. (average value of 10 batches in total) with wide variation, and the pellet tended to be black.

Comparative Example 13

Comparative Example 5 was repeated except that 20 batches of tests were repeated.

Deflection of the degree of vacuum during the decompression started to occur in the 10th batch, and die clogging started to be observed in the 16th batch. Thereafter, the deflection of the degree of vacuum during the decompression gradually increased, but the 20-batch continuous operation could be performed. After 20 batches, the decompression line of the polycondensation reaction vessel 2 was inspected to find about half or more of the pipe being clogged with a sublimate.

For the quality of the pellet obtained, the melting point was 309.1° C. (average value) and tended to be low with wide variation, and the color tone L value was low.

Comparative Example 14

Example 1 was repeated except that 20 batches of tests were repeated; that areas of the outer wall of the acetylation reaction vessel 1 covered with the jackets divided into three were as follows: the heating body 1 (the band-like zone 1): vessel height ratio; 0 to 50%, the heating body 2 (the band-like zone 2): vessel height ratio; 50 to 90%, and the heating body 3 (the band-like zone 3): vessel height ratio; 90 to 100%; and that after an acetylation reaction was carried out at a reaction solution temperature of 145° C. for 1.5 hours, the distillation pipe was switched to the side of the container for distilled acetic acid, and the temperatures of the heating body 2 (the band-like zone 2) and the heating body 3 (the band-like zone 3) were raised individually to 275° C.

The temperature of the reaction solution at the end of the oligomerization reaction in the acetylation reaction vessel 1 was 265° C.; the acetic acid distillation rate was 89%, and the liquid level position at the end of the reaction was within the height range of the heating body 1 (the band-like zone 1). After completion of the transfer to the polycondensation reaction vessel 2, a filter attached to the transfer line was detached to check fouling, and there was adhesion of 69 g of white solid. The test piece underwent a slight color change at the vapor phase portion, but there was no problem at the liquid phase portion.

Deflection of the degree of vacuum during the decompression started to occur in the 9th batch, and die clogging started to be observed in the 16th batch. Thereafter, the deflection of the degree of vacuum during the decompression gradually increased, but the 20-batch continuous operation could be performed. After 20 batches, the decompression line of the polycondensation reaction vessel 2 was inspected to find about half or more of the pipe being clogged with a sublimate.

For the quality of the pellet obtained, the melting point was 307.9° C. (average value) and tended to be low with wide variation, and the color tone L value was low.

Comparative Example 15

Comparative Example 13 was repeated except that the material of the acetylation reaction vessel 1 was changed to SUS316L (composition: Ni; 14% by mass, Cr; 18% by mass, and Mo; 3% by mass) and that the reaction solution was transferred to the polycondensation reaction vessel 2 via a transfer line after the reaction was continued until reaching an acetic acid distillation speed of 0.24%/min and an acetic acid distillation rate of 80%.

Then, Comparative Example 13 was repeated except that, in the polycondensation reaction vessel 2, the temperature was raised with stirring at a shear rate of 510 (1/sec) using an anchor-type stirring blade having a central axis, and decompression was started at the point when the amount of distilled acetic acid reached 85%.

The temperature of the reaction solution at the end of the oligomerization reaction in the acetylation reaction vessel 1 was 260° C., and the liquid level position at the end of the reaction was within the height range of the heating body 1 (the band-like zone 1).

The test piece suffered general corrosion at the vapor phase portion, with the corrosion rate being high, and suffered light general corrosion at the liquid phase portion. Further, at the inner wall and stirring shaft of the acetylation reaction vessel 1, traces of liquid level rising (fouling) considered to be foaming during the reaction were observed. The increase in stirring torque after reaching the degree of vacuum of 1333 Pa was slow, and the polymerization was prematurely terminated. Deflection of the degree of vacuum during the decompression and die clogging were already observed in the 1st batch, and inferior degree of vacuum and clogging in the die portion became worse in the 2nd batch; therefore, the test was stopped. After two batches, the decompression line of the polycondensation reaction vessel 2 was inspected to find about half or more of the pipe being clogged with a sublimate.

After completion of the transfer to the polycondensation reaction vessel 2, a filter attached to the transfer line was detached to check fouling, and pores of the filter was clogged with unreacted monomers. The product yield was lowest.

For the quality of the pellet obtained, the melting point was 300.3° C. (average value of two batches), which was the lowest, and the pellet tended to be black most.

The conditions and results of Examples and Comparative Examples are summarized in Tables 1 to 10. The number of divisions of the band-like zone on the inner wall of the acetylation reaction vessel is the same as the number of divisions of the heating body in each Table; the value of the vessel height ratio (%) that each band-like zone accounts for is the same as the value of the vessel height ratio (%) of the heating body in each Table; and the temperature of each band-like zone (° C.) is the same as the temperature (° C.) of the heating body in each Table.

TABLE 1

| | | Example 1 | Example 2 | Example 3 |
|---|---|---|---|---|
| Heating Body | The Number of Divisions | 3 | 3 | 3 |
| | Vessel Height Ratio of Heating Body 3 (%) | 70 to 90 | 70 to 90 | 70 to 90 |
| | Vessel Height Ratio of Heating Body 2 (%) | 30 to 70 | 30 to 70 | 30 to 70 |
| | Vessel Height Ratio of Heating Body 1 (%) | 0 to 30 | 0 to 30 | 0 to 30 |
| | Temperature of Heating Body 3 (° C.) | 170 | 170 | 170 |
| | Temperature of Heating Body 2 (° C.) | 220 | 220 | 220 |
| | Temperature of Heating Body 1 (° C.) | 275 | 275 | 275 |
| Material of Inner Wall Surface of Reaction Vessel 1 | | A | A | A |
| Liquid Level Position at the End of Oligomerization Reaction | | Band-Like Zone 2 | Band-Like Zone 2 | Band-Like Zone 2 |
| Acetic Acid Distillation Rate After Completion of Oligomerization Reaction (%) | | 89 | 89 | 89 |
| Oligomerization Reaction Time (min) | | 180 | 180 | 180 |
| Mass of Filtered Collection (g) | | 1 | 1 | 1 |
| Corrosion Rate at Vapor Phase Portion in Vessel (mm/y) | | 0.006 Acceptable | 0.006 Acceptable | 0.006 Acceptable |
| Corrosion Rate at Liquid Phase Portion in Vessel (mm/y) | | 0.001 Acceptable | Below 0.001 Acceptable | 0.001 Acceptable |
| Stirring | Blade Shape | Helical Ribbon | Helical Ribbon | Helical Ribbon |
| | Presence of Central Axis | Absent | Absent | Absent |
| | Direction of Stirring Rotation | Down-Pumping | Down-Pumping | Down-Pumping |
| | Stirring Shear Rate Before Decompression (1/sec) | 285 | 285 | 285 |
| Acetic Acid Distillation Rate at the Start of Decompression (%) | | 95 | 95 | 95 |
| Polymerization Time After Reaching the Degree of Vacuum of 1333 Pa (min) | | — | — | — |
| The Number of Batches in which Faulty Decompression Occurred | | Not Occurred | Not Occurred | Not Occurred |
| The Number of Batches in which Die Clogging Occurred | | Not Occurred | Not Occurred | Not Occurred |
| Product Yield (%) | | — | — | — |
| Variation in Melting Point (Standard Deviation) | | 0.64 | 0.71 | 0.85 |
| Color Tone (L Value) | | 57.9 | 54.3 | 50.4 |

TABLE 2

|  |  | Example 4 | Example 5 | Example 6 |
|---|---|---|---|---|
| Heating Body | The Number of Divisions | 3 | 3 | 3 |
|  | Vessel Height Ratio of Heating Body 3 (%) | 70 to 100 | 70 to 90 | 70 to 90 |
|  | Vessel Height Ratio of Heating Body 2 (%) | 45 to 70 | 30 to 70 | 30 to 70 |
|  | Vessel Height Ratio of Heating Body 1 (%) | 0 to 45 | 0 to 30 | 0 to 30 |
|  | Temperature of Heating Body 3 (° C.) | 170 | 170 | 170 |
|  | Temperature of Heating Body 2 (° C.) | 220 | 250 | 220 |
|  | Temperature of Heating Body 1 (° C.) | 275 | 275 | 275 |
| Material of Inner Wall Surface of Reaction Vessel 1 |  | A | A | A |
| Liquid Level Position at the End of Oligomerization Reaction |  | Band-Like Zone 2 | Band-Like Zone 2 | Band-Like Zone 2 |
| Acetic Acid Distillation Rate After Completion of Oligomerization Reaction (%) |  | 89 | 89 | 84 |
| Oligomerization Reaction Time (min) |  | 172 | 175 | 168 |
| Mass of Filtered Collection (g) |  | 6 | 4 | 7 |
| Corrosion Rate at Vapor Phase Portion in Vessel (mm/y) |  | 0.027 Acceptable | 0.029 Acceptable | 0.021 Acceptable |
| Corrosion Rate at Liquid Phase Portion in Vessel (mm/y) |  | 0.002 Acceptable | 0.002 Acceptable | 0.002 Acceptable |
| Stirring | Blade Shape | Helical Ribbon | Helical Ribbon | Helical Ribbon |
|  | Presence of Central Axis | Absent | Absent | Absent |
|  | Direction of Stirring Rotation | Down-Pumping | Down-Pumping | Down-Pumping |
|  | Stirring Shear Rate Before Decompression (1/sec) | 285 | 285 | 285 |
| Acetic Acid Distillation Rate at the Start of Decompression (%) |  | 95 | 95 | 95 |
| Polymerization Time After Reaching the Degree of Vacuum of 1333 Pa (min) |  | — | — | — |
| The Number of Batches in which Faulty Decompression Occurred |  | Not Occurred | Not Occurred | Not Occurred |
| The Number of Batches in which Die Clogging Occurred |  | Not Occurred | Not Occurred | Not Occurred |
| Product Yield (%) |  | — | — | — |
| Variation in Melting Point (Standard Deviation) |  | 0.93 | 0.86 | 1.10 |
| Color Tone (L Value) |  | 55.2 | 56.0 | 54.2 |

TABLE 3

|  |  | Example 7 | Example 8 | Example 9 |
|---|---|---|---|---|
| Heating Body | The Number of Divisions | 3 | 3 | 3 |
|  | Vessel Height Ratio of Heating Body 3 (%) | 70 to 90 | 70 to 90 | 70 to 90 |
|  | Vessel Height Ratio of Heating Body 2 (%) | 30 to 70 | 30 to 70 | 30 to 70 |
|  | Vessel Height Ratio of Heating Body 1 (%) | 0 to 30 | 0 to 30 | 0 to 30 |
|  | Temperature of Heating Body 3 (° C.) | 170 | 170 | 170 |
|  | Temperature of Heating Body 2 (° C.) | 220 | 220 | 220 |
|  | Temperature of Heating Body 1 (° C.) | 275 | 275 | 275 |
| Material of Inner Wall Surface of Reaction Vessel 1 |  | A | A | A |
| Liquid Level Position at the End of Oligomerization Reaction |  | Band-Like Zone 2 | Band-Like Zone 2 | Band-Like Zone 2 |
| Acetic Acid Distillation Rate After Completion of Oligomerization Reaction (%) |  | 89 | 89 | 89 |
| Oligomerization Reaction Time (min) |  | 181 | 181 | 181 |
| Mass of Filtered Collection (g) |  | 2 | 2 | 2 |
| Corrosion Rate at Vapor Phase Portion in Vessel (mm/y) |  | 0.005 Acceptable | 0.007 Acceptable | 0.007 Acceptable |
| Corrosion Rate at Liquid Phase Portion in Vessel (mm/y) |  | 0.001 Acceptable | Below 0.001 Acceptable | 0.001 Acceptable |
| Stirring | Blade Shape | Helical Ribbon | Helical Ribbon | Helical Ribbon |
|  | Presence of Central Axis | Absent | Absent | Absent |
|  | Direction of Stirring Rotation | Down-Pumping | Down-Pumping | Down-Pumping |
|  | Stirring Shear Rate Before Decompression (1/sec) | 285 | 285 | 285 |
| Acetic Acid Distillation Rate at the Start of Decompression (%) |  | 95 | 95 | 95 |
| Polymerization Time After Reaching the Degree of Vacuum of 1333 Pa (min) |  | 15 | 32 | 20 |
| The Number of Batches in which Faulty Decompression Occurred |  | Not Occurred | Not Occurred | Not Occurred |
| The Number of Batches in which Die Clogging Occurred |  | Not Occurred | Not Occurred | Not Occurred |
| Product Yield (%) |  | 97.6 | 97.0 | 96.7 |
| Variation in Melting Point (Standard Deviation) |  | 0.61 | 0.69 | 0.84 |
| Color Tone (L Value) |  | 58.1 | 54.5 | 50.2 |

TABLE 4

|  |  | Example 10 | Example 11 | Example 12 |
|---|---|---|---|---|
| Heating Body | The Number of Divisions | 3 | 3 | 3 |
|  | Vessel Height Ratio of Heating Body 3 (%) | 70 to 100 | 70 to 90 | 70 to 90 |
|  | Vessel Height Ratio of Heating Body 2 (%) | 45 to 70 | 30 to 70 | 30 to 70 |
|  | Vessel Height Ratio of Heating Body 1 (%) | 0 to 45 | 0 to 30 | 0 to 30 |
|  | Temperature of Heating Body 3 (° C.) | 170 | 170 | 170 |
|  | Temperature of Heating Body 2 (° C.) | 220 | 250 | 220 |
|  | Temperature of Heating Body 1 (° C.) | 275 | 275 | 275 |
| Material of Inner Wall Surface of Reaction Vessel 1 |  | A | A | A |
| Liquid Level Position at the End of Oligomerization Reaction |  | Band-Like Zone 2 | Band-Like Zone 2 | Band-Like Zone 2 |
| Acetic Acid Distillation Rate After Completion of Oligomerization Reaction (%) |  | 89 | 89 | 84 |
| Oligomerization Reaction Time (min) |  | 170 | 174 | 169 |
| Mass of Filtered Collection (g) |  | 9 | 6 | 11 |
| Corrosion Rate at Vapor Phase Portion in Vessel (mm/y) |  | 0.025 Acceptable | 0.032 Acceptable | 0.020 Acceptable |
| Corrosion Rate at Liquid Phase Portion in Vessel (mm/y) |  | 0.004 Acceptable | 0.002 Acceptable | 0.002 Acceptable |
| Stirring | Blade Shape | Helical Ribbon | Helical Ribbon | Helical Ribbon |
|  | Presence of Central Axis | Absent | Absent | Absent |
|  | Direction of Stirring Rotation | Down-Pumping | Down-Pumping | Down-Pumping |

TABLE 4-continued

|  | Example 10 | Example 11 | Example 12 |
|---|---|---|---|
| Stirring Shear Rate Before Decompression (1/sec) | 285 | 285 | 285 |
| Acetic Acid Distillation Rate at the Start of Decompression (%) | 95 | 95 | 95 |
| Polymerization Time After Reaching the Degree of Vacuum of 1333 Pa (min) | 37 | 20 | 46 |
| The Number of Batches in which Faulty Decompression Occurred | Not Occurred | Not Occurred | Not Occurred |
| The Number of Batches in which Die Clogging Occurred | Not Occurred | Not Occurred | Not Occurred |
| Product Yield (%) | 95.9 | 97.1 | 94.8 |
| Variation in Melting Point (Standard Deviation) | 0.96 | 0.85 | 1.12 |
| Color Tone (L Value) | 54.9 | 56.1 | 54.0 |

TABLE 5

|  |  | Example 13 | Example 14 | Example 15 |
|---|---|---|---|---|
| Heating Body | The Number of Divisions | 3 | 3 | 3 |
|  | Vessel Height Ratio of Heating Body 3 (%) | 70 to 90 | 70 to 90 | 70 to 90 |
|  | Vessel Height Ratio of Heating Body 2 (%) | 30 to 70 | 30 to 70 | 30 to 70 |
|  | Vessel Height Ratio of Heating Body 1 (%) | 0 to 30 | 0 to 30 | 0 to 30 |
|  | Temperature of Heating Body 3 (° C.) | 170 | 170 | 170 |
|  | Temperature of Heating Body 2 (° C.) | 220 | 220 | 220 |
|  | Temperature of Heating Body 1 (° C.) | 275 | 275 | 275 |
| Material of Inner Wall Surface of Reaction Vessel 1 |  | A | A | A |
| Liquid Level Position at the End of Oligomerization Reaction |  | Band-Like Zone 2 | Band-Like Zone 2 | Band-Like Zone 2 |
| Acetic Acid Distillation Rate After Completion of Oligomerization Reaction (%) |  | 84 | 89 | 89 |
| Oligomerization Reaction Time (min) |  | 169 | 181 | 181 |
| Mass of Filtered Collection (g) |  | 11 | 2 | 2 |
| Corrosion Rate at Vapor Phase Portion in Vessel (mm/y) |  | 0.019 Acceptable | 0.005 Acceptable | 0.005 Acceptable |
| Corrosion Rate at Liquid Phase Portion in Vessel (mm/y) |  | 0.002 Acceptable | 0.001 Acceptable | 0.001 Acceptable |
| Stirring | Blade Shape | Helical Ribbon | Helical Ribbon | Helical Ribbon |
|  | Presence of Central Axis | Absent | Absent | Present |
|  | Direction of Stirring Rotation | Down-Pumping | Down-Pumping | Down-Pumping |
|  | Stirring Shear Rate Before Decompression (1/sec) | 285 | 285 | 285 |
| Acetic Acid Distillation Rate at the Start of Decompression (%) |  | 89 | 90 | 95 |
| Polymerization Time After Reaching the Degree of Vacuum of 1333 Pa (min) |  | 51 | 25 | 40 |
| The Number of Batches in which Faulty Decompression Occurred |  | 19 | Not Occurred | Not Occurred |
| The Number of Batches in which Die Clogging Occurred |  | Not Occurred | Not Occurred | 19 |
| Product Yield (%) |  | 94.5 | 96.8 | 94.0 |
| Variation in Melting Point (Standard Deviation) |  | 1.72 | 1.02 | 1.29 |
| Color Tone (L Value) |  | 51.6 | 55.5 | 52.7 |

TABLE 6

|  |  | Comparative Example 1 | Comparative Example 2 | Comparative Example 3 |
|---|---|---|---|---|
| Heating Body | The Number of Divisions | 3 | 3 | 3 |
|  | Vessel Height Ratio of Heating Body 3 (%) | 70 to 90 | 70 to 90 | 70 to 90 |
|  | Vessel Height Ratio of Heating Body 2 (%) | 30 to 70 | 30 to 70 | 30 to 70 |
|  | Vessel Height Ratio of Heating Body 1 (%) | 0 to 30 | 0 to 30 | 0 to 30 |
|  | Temperature of Heating Body 3 (° C.) | 170 | 170 | 170 |
|  | Temperature of Heating Body 2 (° C.) | 220 | 220 | 220 |
|  | Temperature of Heating Body 1 (° C.) | 275 | 275 | 275 |
| Material of Inner Wall Surface of Reaction Vessel 1 |  | Titanium | Glass Lining | SUS316L |
| Liquid Level Position at the End of Oligomerization Reaction |  | Band-Like Zone 2 | Band-Like Zone 2 | Band-Like Zone 2 |
| Acetic Acid Distillation Rate After Completion of Oligomerization Reaction (%) |  | 89 | 89 | 89 |
| Oligomerization Reaction Time (min) |  | 300 | 335 | 165 |
| Mass of Filtered Collection (g) |  | 25 | 32 | 16 |
| Corrosion Rate at Vapor Phase Portion in Vessel (mm/y) |  | 0.051 Acceptable | 0.048 Acceptable | 0.175 General Corrosion |
| Corrosion Rate at Liquid Phase Portion in Vessel (mm/y) |  | 0.010 Acceptable | 0.007 Acceptable | 0.142 General Corrosion |
| Stirring | Blade Shape | Helical Ribbon | Helical Ribbon | Helical Ribbon |
|  | Presence of Central Axis | Absent | Absent | Absent |
|  | Direction of Stirring Rotation | Down-Pumping | Down-Pumping | Down-Pumping |
|  | Stirring Shear Rate Before Decompression (1/sec) | 285 | 285 | 285 |
| Acetic Acid Distillation Rate at the Start of Decompression (%) |  | 95 | 95 | 95 |
| Polymerization Time After Reaching the Degree of Vacuum of 1333 Pa (min) |  | — | — | — |
| The Number of Batches in which Faulty Decompression Occurred |  | Not Occurred | Not Occurred | Not Occurred |
| The Number of Batches in which Die Clogging Occurred |  | Not Occurred | Not Occurred | Not Occurred |
| Product Yield (%) |  | — | — | — |
| Variation in Melting Point (Standard Deviation) |  | 3.12 | 4.13 | 2.12 |
| Color Tone (L Value) |  | 44.5 | 42.7 | 49.2 |

TABLE 7

|  |  | Comparative Example 4 | Comparative Example 5 | Comparative Example 6 |
|---|---|---|---|---|
| Heating Body | The Number of Divisions | 3 | 2 | 3 |
|  | Vessel Height Ratio of Heating Body 3 (%) | 70 to 90 | — | 70 to 90 |
|  | Vessel Height Ratio of Heating Body 2 (%) | 30 to 70 | 50 to 90 | 30 to 70 |
|  | Vessel Height Ratio of Heating Body 1 (%) | 0 to 30 | 0 to 50 | 0 to 30 |
|  | Temperature of Heating Body 3 (° C.) | 170 | — | 170 |
|  | Temperature of Heating Body 2 (° C.) | 220 | 275 | 220 |
|  | Temperature of Heating Body 1 (° C.) | 275 | 275 | 275 |
| Material of Inner Wall Surface of Reaction Vessel 1 |  | SUS316L | A | Titanium |

TABLE 7-continued

| | Comparative Example 4 | Comparative Example 5 | Comparative Example 6 |
|---|---|---|---|
| Liquid Level Position at the End of Oligomerization Reaction | Band-Like Zone 2 | Band-Like Zone 1 | Band-Like Zone 2 |
| Acetic Acid Distillation Rate After Completion of Oligomerization Reaction (%) | 80 | 89 | 89 |
| Oligomerization Reaction Time (min) | 147 | 162 | 305 |
| Mass of Filtered Collection (g) | 100 or more | 40 | 37 |
| Corrosion Rate at Vapor Phase Portion in Vessel (mm/y) | 0.132 General Corrosion | 0.078 Slight Color Change | 0.052 Acceptable |
| Corrosion Rate at Liquid Phase Portion in Vessel (mm/y) | 0.093 Light General Corrosion | 0.004 Acceptable | 0.011 Acceptable |
| Stirring Blade Shape | Helical Ribbon | Helical Ribbon | Helical Ribbon |
| Presence of Central Axis | Absent | Absent | Absent |
| Direction of Stirring Rotation | Down-Pumping | Down-Pumping | Down-Pumping |
| Stirring Shear Rate Before Decompression (1/sec) | 285 | 285 | 285 |
| Acetic Acid Distillation Rate at the Start of Decompression (%) | 95 | 95 | 95 |
| Polymerization Time After Reaching the Degree of Vacuum of 1333 Pa (min) | — | — | 58 |
| The Number of Batches in which Faulty Decompression Occurred | (Stopped at 5th Batch) | Not Occurred | 14 |
| The Number of Batches in which Die Clogging Occurred | (Stopped at 5th Batch) | Not Occurred | 18 |
| Product Yield (%) | — | — | 93.1 |
| Variation in Melting Point (Standard Deviation) | 7.03 | 4.90 | 3.18 |
| Color Tone (L Value) | 38.5 | 45.3 | 44.0 |

TABLE 8

| | Comparative Example 7 | Comparative Example 8 | Comparative Example 9 |
|---|---|---|---|
| Heating Body The Number of Divisions | 3 | 3 | 3 |
| Vessel Height Ratio of Heating Body 3 (%) | 70 to 90 | 70 to 90 | 70 to 90 |
| Vessel Height Ratio of Heating Body 2 (%) | 30 to 70 | 30 to 70 | 30 to 70 |
| Vessel Height Ratio of Heating Body 1 (%) | 0 to 30 | 0 to 30 | 0 to 30 |
| Temperature of Heating Body 3 (°C.) | 170 | 170 | 170 |
| Temperature of Heating Body 2 (°C.) | 220 | 220 | 220 |
| Temperature of Heating Body 1 (°C.) | 275 | 275 | 275 |
| Material of Inner Wall Surface of Reaction Vessel 1 | Titanium | Titanium | Glass Lining |
| Liquid Level Position at the End of Oligomerization Reaction | Band-Like Zone 2 | Band-Like Zone 2 | Band-Like Zone 2 |
| Acetic Acid Distillation Rate After Completion of Oligomerization Reaction (%) | 89 | 89 | 89 |
| Oligomerization Reaction Time (min) | 306 | 300 | 342 |
| Mass of Filtered Collection (g) | 37 | 25 | 51 |
| Corrosion Rate at Vapor Phase Portion in Vessel (mm/y) | 0.051 Acceptable | 0.051 Acceptable | 0.050 Acceptable |
| Corrosion Rate at Liquid Phase Portion in Vessel (mm/y) | 0.011 Acceptable | 0.010 Acceptable | 0.007 Acceptable |
| Stirring Blade Shape | Helical Ribbon | Anchor-Type | Helical Ribbon |
| Presence of Central Axis | Absent | Present | Absent |
| Direction of Stirring Rotation | Up-Pumping | — | Down-Pumping |
| Stirring Shear Rate Before Decompression (1/sec) | 285 | 285 | 285 |
| Acetic Acid Distillation Rate at the Start of Decompression (%) | 95 | 95 | 95 |
| Polymerization Time After Reaching the Degree of Vacuum of 1333 Pa (min) | 71 | 141 | 67 |
| The Number of Batches in which Faulty Decompression Occurred | 12 | 6 (Stopped at 10th Batch) | 12 |
| The Number of Batches in which Die Clogging Occurred | 15 | 2 (Stopped at 10th Batch) | 18 |
| Product Yield (%) | 90.0 | 86.5 | 92.5 |
| Variation in Melting Point (Standard Deviation) | 4.62 | 7.67 | 4.21 |
| Color Tone (L Value) | 40.5 | 37.8 | 42.0 |

TABLE 9

| | Comparative Example 10 | Comparative Example 1 | Comparative Example 12 |
|---|---|---|---|
| Heating Body The Number of Divisions | 3 | 3 | 3 |
| Vessel Height Ratio of Heating Body 3 (%) | 70 to 90 | 70 to 90 | 70 to 90 |
| Vessel Height Ratio of Heating Body 2 (%) | 30 to 70 | 30 to 70 | 30 to 70 |
| Vessel Height Ratio of Heating Body 1 (%) | 0 to 30 | 0 to 30 | 0 to 30 |
| Temperature of Heating Body 3 (°C.) | 170 | 170 | 170 |
| Temperature of Heating Body 2 (°C.) | 220 | 220 | 220 |
| Temperature of Heating Body 1 (°C.) | 275 | 275 | 275 |
| Material of Inner Wall Surface of Reaction Vessel 1 | SUS316L | SUS316L | SUS316L |
| Liquid Level Position at the End of Oligomerization Reaction | Band-Like Zone 2 | Band-Like Zone 2 | Band-Like Zone 2 |
| Acetic Acid Distillation Rate After Completion of Oligomerization Reaction (%) | 89 | 80 | 80 |
| Oligomerization Reaction Time (min) | 163 | 147 | 147 |
| Mass of Filtered Collection (g) | 22 | 100 or More | 100 or More |
| Corrosion Rate at Vapor Phase Portion in Vessel (mm/y) | 0.190 General Corrosion | 0.132 General Corrosion | 0.132 General Corrosion |
| Corrosion Rate at Liquid Phase Portion in Vessel (mm/y) | 0.150 General Corrosion | 0.093 Light General Corrosion | 0.093 Light General Corrosion |
| Stirring Blade Shape | Helical Ribbon | Helical Ribbon | Helical Ribbon |
| Presence of Central Axis | Absent | Absent | Absent |
| Direction of Stirring Rotation | Down-Pumping | Down-Pumping | Down-Pumping |
| Stirring Shear Rate Before Decompression (1/sec) | 285 | 285 | 285 |

TABLE 9-continued

|  | Comparative Example 10 | Comparative Example 1 | Comparative Example 12 |
|---|---|---|---|
| Acetic Acid Distillation Rate at the Start of Decompression (%) | 95 | 95 | 85 |
| Polymerization Time After Reaching the Degree of Vacuum of 1333 Pa (min) | 54 | 128 | 300 |
| The Number of Batches in which Faulty Decompression Occurred | 16 | (Stopped at 5th Batch) | 1 (Stopped at 5th Batch) |
| The Number of Batches in which Die Clogging Occurred | 18 | (Stopped at 5th Batch) | (Stopped at 5th Batch) |
| Product Yield (%) | 93.8 | 88.3 | 81.4 |
| Variation in Melting Point (Standard Deviation) | 2.19 | 7.03 | 8.87 |
| Color Tone (L Value) | 48.8 | 38.5 | 35.4 |

TABLE 10

|  |  | Comparative Example 13 | Comparative Example 14 | Comparative Example 15 |
|---|---|---|---|---|
| Heating Body | The Number of Divisions | 2 | 3 | 2 |
|  | Vessel Height Ratio of Heating Body 3 (%) | — | 90 to 100 | — |
|  | Vessel Height Ratio of Heating Body 2 (%) | 50 to 90 | 50 to 90 | 50 to 90 |
|  | Vessel Height Ratio of Heating Body 1 (%) | 0 to 50 | 0 to 50 | 0 to 50 |
|  | Temperature of Heating Body 3 (° C.) | — | 275 | — |
|  | Temperature of Heating Body 2 (° C.) | 275 | 275 | 275 |
|  | Temperature of Heating Body 1 (° C.) | 275 | 275 | 275 |
| Material of Inner Wall Surface of Reaction Vessel 1 |  | A | A | SUS316L |
| Liquid Level Position at the End of Oligomerization Reaction |  | Band-Like Zone 1 | Band-Like Zone 1 | Band-Like Zone 1 |
| Acetic Acid Distillation Rate After Completion of Oligomerization Reaction (%) |  | 89 | 89 | 80 |
| Oligomerization Reaction Time (min) |  | 159 | 156 | 138 |
| Mass of Filtered Collection (g) |  | 64 | 69 | 100 or More |
| Corrosion Rate at Vapor Phase Portion in Vessel (mm/y) |  | 0.080 Slight Color Change | 0.088 Slight Color Change | 0.167 General Corrosion |
| Corrosion Rate at Liquid Phase Portion in Vessel (mm/y) |  | 0.005 Acceptable | 0.004 Acceptable | 0.099 Light General Corrosion |
| Stirring | Blade Shape | Helical Ribbon | Helical Ribbon | Anchor-Type |
|  | Presence of Central Axis | Absent | Absent | Present |
|  | Direction of Stirring Rotation | Down-Pumping | Down-Pumping | — |
|  | Stirring Shear Rate Before Decompression (1/sec) | 285 | 285 | 510 |
| Acetic Acid Distillation Rate at the Start of Decompression (%) |  | 95 | 95 | 85 |
| Polymerization Time After Reaching the Degree of Vacuum of 1333 Pa (min) |  | 77 | 83 | 360 |
| The Number of Batches in which Faulty Decompression Occurred |  | 10 | 9 | 1 (Stopped at 2nd Batch) |
| The Number of Batches in which Die Clogging Occurred |  | 16 | 16 | 1 (Stopped at 2nd Batch) |
| Product Yield (%) |  | 91.0 | 90.3 | 75.0 |
| Variation in Melting Point (Standard Deviation) |  | 5.10 | 5.55 | — |
| Color Tone (L Value) |  | 44.0 | 41.6 | 31.5 |

REFERENCE SIGNS LIST

1: Acetylation reaction vessel
2: Stirring blade
3: Transfer line to polycondensation reaction vessel
4: Heating body 3 (band-like zone 3)
5: Heating body 2 (band-like zone 2)
6: Heating body 1 (band-like zone 1)
7: Height to the lower end of heating body 1 (band-like zone 1)
8: Height to the upper end of heating body 1 (band-like zone 1)
9: Height to the lower end of heating body 2 (band-like zone 2)
10: Height to the upper end of heating body 2 (band-like zone 2)
11: Height to the lower end of heating body 3 (band-like zone 3)
12: Height to the upper end of heating body 3 (band-like zone 3)
13: Highest point inside acetylation reaction vessel
14: Lowest point inside acetylation reaction vessel
15: Height of acetylation reaction vessel
16: Rotation axis (central axis)
17: Frame rod
18: Helical ribbon blade
19: Bottom blade
20: Reaction container
21: Fixing rod

The invention claimed is:

1. An apparatus for producing a liquid crystalline polyester resin, comprising an acetylation reaction vessel and a polycondensation reaction vessel,
    wherein said acetylation reaction vessel has an inner wall surface composed of an alloy containing 50% by mass or more of Ni and 10% by mass or more of Mo and comprises at least three heating bodies to heat the inside of the vessel; and
    when taking said heating bodies as a heating body 1, a heating body 2, . . . , and a heating body n from the bottom of said acetylation reaction vessel, at least a heating body m is located within the vessel height ratio represented by Equation (1) below of 20 to 80%; n is an integer of 3 or more; and m is any integer from 2 to (n−1):

Vessel height ratio (%)=Height from the lowest point inside acetylation reaction vessel to corresponding position (mm)/Height from the lowest point inside acetylation reaction vessel to the highest point (mm)×100(%).    Equation (1)

2. The apparatus for producing a liquid crystalline polyester resin according to claim 1, wherein the alloy constituting the inner wall surface of said acetylation reaction vessel further contains 10% by mass or more of Cr.

3. The apparatus for producing a liquid crystalline polyester resin according to claim 1, wherein said heating bodies are jackets wrapping the outer wall surface of said acetylation reaction vessel into band form.

4. The apparatus for producing a liquid crystalline polyester resin according to claim 1, wherein said acetylation reaction vessel comprises three said heating bodies.

5. The apparatus for producing a liquid crystalline polyester resin according to claim 1, wherein said polycondensation reaction vessel has a helical ribbon impeller attached to a frame that does not have a central axis.

6. A process for producing a liquid crystalline polyester resin using the apparatus for producing a liquid crystalline polyester resin according to claim 1, comprising carrying out an acetylation reaction and an oligomerization reaction of raw materials in said acetylation reaction vessel, and then carrying out a deacetylation polycondensation of a liquid after the oligomerization reaction in said polycondensation reaction vessel, wherein the oligomerization reaction is carried out with the temperatures of said heating body 1 to said heating body (m−1) all being controlled at higher than the temperature of said heating body m and the temperatures of said heating body (m+1) to said heating body n all being controlled at lower than the temperature of said heating body m from the point when an acetic acid distillation rate represented by Equation (2) below reaches 80% or more to the point when an acetic acid distillation speed represented by Equation (3) below decreases to 0.1%/min or less during said oligomerization reaction:

Acetic acid distillation rate (%)=Amount of distillate (g)/[[Number of moles of acetic anhydride charged−Number of moles of hydroxyl groups in original monomers]×Molecular weight of acetic anhydride +Number of moles of hydroxyl groups in original monomers×2×Molecular weight of acetic acid+Number of moles of acetyl groups in original monomers×Molecular weight of acetic acid] (g)×100(%); and    Equation (2)

Acetic acid distillation speed (%/min)=Amount of acetic acid distillate that distilled in 5 minutes (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%)/5 (min).    Equation (3)

7. The process for producing a liquid crystalline polyester resin according to claim 6, wherein original monomers are charged in such an amount that a liquid level height after said oligomerization reaction falls within a heating range of said heating body m.

8. A process for producing a liquid crystalline polyester resin, comprising carrying out an acetylation reaction and an oligomerization reaction of raw materials in an acetylation reaction vessel, and then carrying out a deacetylation polycondensation of a liquid after the oligomerization reaction in a polycondensation reaction vessel, wherein the acetylation reaction vessel used is a vessel having an inner wall surface composed of an alloy containing 50% by mass or more of Ni and 10% by mass or more of Mo; and the inner wall surface of said acetylation reaction vessel is divided into three or more band-like zones arrayed in the height direction of the vessel, and said oligomerization reaction is carried out while maintaining the temperatures of each band-like zone in a particular relationship, provided that, when taking each of said band-like zones as a band-like zone 1, a band-like zone 2, . . . , and a band-like zone n from the bottom of said acetylation reaction vessel, at least a band-like zone m is located within the vessel height ratio represented by Equation (1) below of 20 to 80%; n is an integer of 3 or more; and m is any integer from 2 to (n−1); and for the particular relationship of the temperatures of each of said band-like zones, during the oligomerization reaction, the temperatures of the band-like zone 1 to a band-like zone (m−1) are all controlled at higher than the temperature of the band-like zone m, and the temperatures of a band-like zone (m+1) to the band-like zone n are all controlled at lower than the temperature of the band-like zone m from the point when an acetic acid distillation rate represented by Equation (2) below reaches 80% or more to the point when an acetic acid distillation speed represented by Equation (3) below decreases to 0.1%/min or less:

Vessel height ratio (%)=Height from the lowest point inside acetylation reaction vessel to corresponding position (mm)/Height from the lowest point inside acetylation reaction vessel to the highest point (mm)×100(%)    Equation (1)

Acetic acid distillation rate (%)=Amount of distillate (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%); and    Equation (2)

Acetic acid distillation speed (%/min)=Amount of acetic acid distillate that distilled in 5 minutes (g)/[[Number of moles of acetic anhydride charged−Number of moles of hydroxyl groups in original monomers]×Molecular weight of acetic anhydride+Number of moles of hydroxyl groups in original monomers×2×Molecular weight of acetic acid+Number of moles of acetyl groups in original monomers×Molecular weight of acetic acid] (g)×100(%)/5 (min).    Equation (3)

9. The process for producing a liquid crystalline polyester resin according to claim 8, wherein the alloy constituting the inner wall surface of said acetylation reaction vessel further contains 10% by mass or more of Cr.

10. The process for producing a liquid crystalline polyester resin according to claim 8, wherein the inner wall surface of said acetylation reaction vessel is divided into said three band-like zones arrayed in the height direction of the vessel, and said oligomerization reaction is carried out while maintaining the temperatures of each band-like zone individually and while maintaining the temperatures of each band-like zone in said particular relationship.

11. The process for producing a liquid crystalline polyester resin according to claim 8, wherein original monomers are charged in such an amount that a liquid level height after said oligomerization reaction falls within the range of said band-like zone m.

12. The process for producing a liquid crystalline polyester resin according to claim 8, wherein acetic acid in raw materials is distilled in said acetylation reaction vessel by 85% or more of the theoretical amount of acetic acid distillation, and then the raw materials are transferred to the polycondensation reaction vessel.

13. The process for producing a liquid crystalline polyester resin according to claim 8, wherein decompression is started at an acetic acid distillation rate of 90% or more in said step of carrying out a deacetylation polycondensation.

14. The process for producing a liquid crystalline polyester resin according to claim 8, wherein said polycondensation reaction vessel has a helical ribbon impeller, and the stirring shear rate before starting the decompression is 150 to 500 (1/sec) in said step of carrying out a deacetylation polycondensation.

15. The process for producing a liquid crystalline polyester resin according to claim 14, wherein the direction of rotation of a stirring impeller is a down-pumping direction in said step of carrying out a deacetylation polycondensation.

16. The process for producing a liquid crystalline polyester resin according to claim 8, wherein hydroquinone is contained as an original monomer.

17. The process for producing a liquid crystalline polyester resin according to claim 8, wherein said liquid crystalline polyester resin is a liquid crystalline polyester resin composed of the following structural units (I), (II), (III), (IV), and (V), the structural unit (I) being 65 to 80 mol % based on the total of the structural units (I), (II), and (III), the structural unit (II) being 55 to 85 mol % based on the total of the structural units (II) and (III), the structural unit (IV) being 50 to 95 mol % based on the total of the structural units (IV) and (V), and the total of the structural units (II) and (III) and the total of the structural units (IV) and (V) being substantially equimolar.

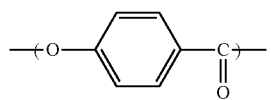
(I)

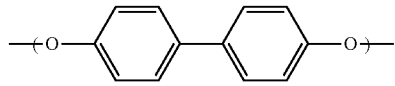
(II)

(III)

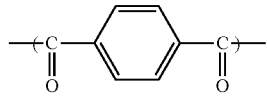
(IV)

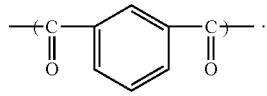
(V)

18. The process for producing a liquid crystalline polyester resin according to claim 8, wherein hydroquinone is contained as an original monomer, and said polycondensation reaction vessel has a helical ribbon impeller, and the stirring shear rate before starting the decompression is 150 to 500 (1/sec) in said step of carrying out a deacetylation polycondensation.

* * * * *